(12) United States Patent
Nakano et al.

(10) Patent No.: US 7,051,924 B2
(45) Date of Patent: May 30, 2006

(54) VALUE HOLDING SYSTEM, VALUE HOLDING METHOD, VALUE HOLDING PROGRAM, AND TRANSACTION SYSTEM

(75) Inventors: Toshihisa Nakano, Neyagawa (JP); Motoji Ohmori, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/842,736

(22) Filed: May 11, 2004

(65) Prior Publication Data
US 2004/0238624 A1    Dec. 2, 2004

(30) Foreign Application Priority Data
May 13, 2003    (JP)    ............................. 2003-134394

(51) Int. Cl.
*G06K 5/00*    (2006.01)

(52) U.S. Cl. ...................... 235/375; 235/380; 235/381; 235/382; 235/383; 235/449; 705/13; 705/35; 340/5.2; 340/5.21; 340/5.8; 455/558

(58) Field of Classification Search ................ 235/375, 235/380–383, 449, 381; 705/13–35, 41; 340/5.2–5.21, 5.8, 52; 455/558
See application file for complete search history.

(56) References Cited

U.S. PATENT DOCUMENTS

| | | | |
|---|---|---|---|
| 4,764,928 A | | 8/1988 | Akerberg |
| 5,153,581 A | | 10/1992 | Hazard ........................ 340/5.8 |
| 5,579,496 A | * | 11/1996 | Van Steenbrugge ......... 712/226 |
| 5,774,877 A | * | 6/1998 | Patterson et al. ............. 705/35 |
| 6,108,534 A | | 8/2000 | Bourgeois et al. |
| 6,111,677 A | * | 8/2000 | Shintani et al. ............. 398/126 |
| 6,119,096 A | * | 9/2000 | Mann et al. .................... 705/5 |
| 6,595,416 B1 | * | 7/2003 | Newsome et al. .......... 235/381 |
| 2002/0161729 A1 | * | 10/2002 | Andrews ..................... 705/417 |
| 2003/0019927 A1 | * | 1/2003 | Lindgren et al. ........... 235/382 |
| 2003/0042307 A1 | * | 3/2003 | Prow et al. .................. 235/449 |
| 2004/0083414 A1 | * | 4/2004 | Parker et al. ................ 714/737 |
| 2004/0127256 A1 | * | 7/2004 | Goldthwaite et al. ....... 455/558 |
| 2005/0033692 A1 | * | 2/2005 | Jarman et al. ................ 705/41 |

FOREIGN PATENT DOCUMENTS

| | | |
|---|---|---|
| EP | 0 949 593 | 10/1999 |
| EP | 0 950 968 | 10/1999 |
| EP | 0 961 438 | 12/1999 |
| JP | 8-27822 | 3/1996 |
| JP | 10-229392 | 8/1998 |
| WO | 01/69540 | 9/2001 |

* cited by examiner

*Primary Examiner*—Michael G. Lee
*Assistant Examiner*—Allyson N Trail
(74) *Attorney, Agent, or Firm*—Wenderoth, Lind & Ponack, L.L.P.

(57) ABSTRACT

A value holding system includes a receiving unit that receives an instruction to add or remove a value relating to a payment, a judging unit that judges whether the instruction is identical to a previously received instruction, and a rejecting unit that rejects the instruction when the judging unit judges that the instruction is identical to the previous instruction. According to the value holding system so constructed, it is possible to reject an invalid payment request in order to prevent an incorrect collection of payment.

19 Claims, 11 Drawing Sheets

FIG.5 MUTUAL AUTHENTICATION AND SHARING OF KEY

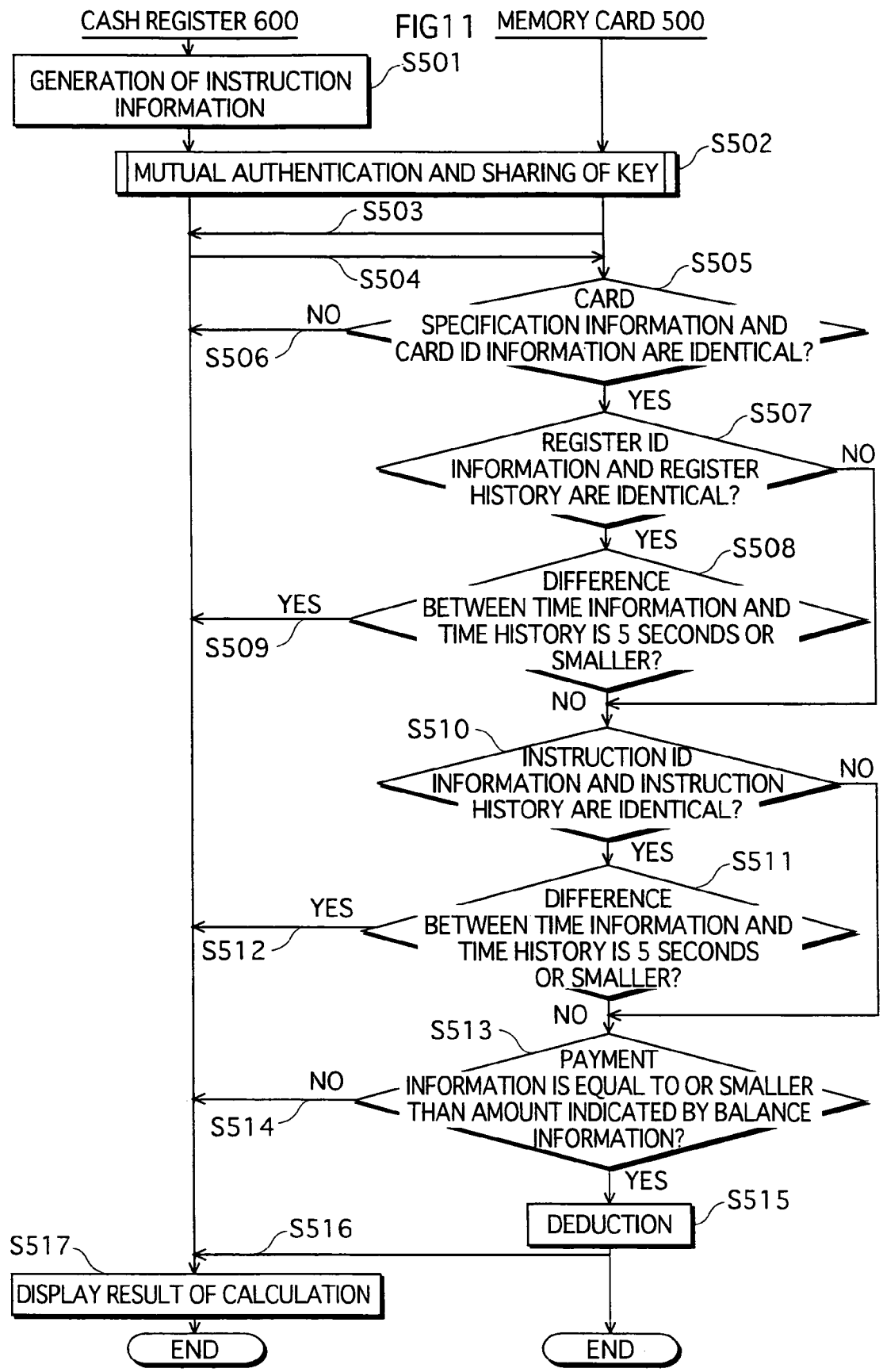

VALUE HOLDING SYSTEM, VALUE HOLDING METHOD, VALUE HOLDING PROGRAM, AND TRANSACTION SYSTEM

This application is based on an application NO. 2003-134394 filed in Japan, the content of which is hereby incorporated by reference.

BACKGROUND OF THE INVENTION (1) Field of the Invention

The present invention relates to a value holding system that manages a value used in a payment, and more specifically, the present invention relates to a technique for avoiding errors in managing the value.

(2) Description of the Related Art

In recent years, memory cards that have multiple functions such as a prepaid card and commuter pass functions are utilized in the field of electronic payment. A railway fare adjustment system using a memory card with a prepaid card and commuter pass functionalities is explained below as one example of the uses of such memory cards.

A railway user carries the memory card when taking a train. The user goes through an automatic ticket gate using the memory card when entering and exiting a station. When the user takes a train over a zone specified by the memory card as a commuter pass, information relating to fare adjustment is transmitted between the memory card and the automatic ticket gate. Then, an additional fare is deducted from an amount of prepaid money which is recorded in the memory card as a prepaid card, and the fare adjustment is completed.

In order to ensure security, such as a mutual authentication and encryption of the information disclosed in the below-identified patent document 1, and a verification of the memory card as disclosed in the below-identified patent document 2 are performed in the transmission of the information between the memory card and the automatic ticket gate.

In the transmission of the information, however, an issue has been noted that the automatic ticket gate accidentally requests the memory card for a payment for the same service more than once, the memory card also processes the payment more than once, and thus the amount accidentally requested by the automatic ticket gate is deducted from the memory card. Further, another issue has also been noted that the automatic ticket gate recognizes the zone which is specified by the memory card incorrectly and requests the memory card for a payment for an additional fare based on the incorrectly recognized zone, and the incorrect additional fare is deducted from the memory card.

Patent Document 1

Japanese Published Unexamined Application No. H10-229392

Patent Document 2

Japanese Published Examined Application No. H8-27822

SUMMARY OF THE INVENTION

In view of the above noted issues, the present invention aims to provide a value holding system that avoids incorrect collections.

In order to solve the above noted issues, a value holding system according to the present invention is a value holding system comprising a receiving unit operable to receive an instruction to add or remove a value relating to a payment, a judging unit operable to judge whether the instruction is identical to an instruction that has been previously received, and a rejecting unit operable to reject the instruction when the instruction is judged to be identical to the previous instruction.

By the above construction, the instruction is rejected when the instruction to add or remove the value is identical to the previous instruction. Accordingly, it is possible to limit the addition or removal of the value to only once, even when the same instruction is received for the second time due to errors in an instruction apparatus.

The above-described value holding system may also be such that the value is equivalent to an amount of money, and the receiving unit receives, as the instruction, instruction information that indicates adding or removing the amount of money shown by the value.

By the above construction, the instruction is rejected when the instruction to add or remove the value is identical to the previous instruction. Accordingly, it is possible to prevent an incorrect collection by limiting the addition or removal of the amount of money to only once, even when the same instruction is received for the second time due to errors in an instruction apparatus.

The above-described value holding system may also be such that the judging unit (i) stores a piece of instruction information last received by the receiving unit, and (ii) judges whether the instruction is identical to the previous instruction by using the stored piece of instruction information and the currently received piece of instruction information.

By the above construction, the judging unit judges whether the instruction is identical to the previous instruction by using a piece of instruction information which is presently received by the receiving unit and a piece of instruction information which was most recently received by the receiving unit. Accordingly, it is possible to prevent an incorrect collection by limiting the addition or removal of the amount of money to only once, even when the same instruction is received a second time.

The above-described value holding system may also be such that the judging unit judges that the instruction is identical to the previous instruction when the stored piece of instruction information matches the currently received piece of instruction information.

By the above construction, it is judged that the instruction is identical to the previous instruction when the stored piece of instruction information matches the received piece of instruction information. Accordingly, it is possible to prevent an incorrect collection by limiting the addition or removal of the value to only once, even when the same instruction is received a second time.

The above-described value holding system may also be such that each instruction information contains an apparatus ID identifying an instruction apparatus, and the judging unit judges that the instruction is identical to the previous instruction when an apparatus ID contained in the stored piece of instruction information matches an apparatus ID contained in the currently received piece of instruction information.

By the above construction, it is judged that the instruction is identical to the previous instruction when the apparatus ID in the stored piece of instruction information matches the apparatus ID in the received piece of instruction information. Accordingly, it is possible to prevent an incorrect collection by limiting the addition or removal of the value to only once, even when the instruction from the same apparatus is received a second time.

The above-described value holding system may also be such that each instruction information contains a location ID identifying a location of an external instruction apparatus, and the judging unit judges that the instruction is identical to the previous instruction when a location ID contained in the stored piece of instruction information matches a location ID contained in the currently received piece of instruction information.

By the above construction, it is judged that the instruction is identical to the previous instruction when the location ID in the stored piece of instruction information matches the location ID in the received piece of instruction information. Accordingly, it is possible to prevent an incorrect collection by limiting the addition or removal of the value to only once, even when the instruction from an apparatus at the same location is received a second time.

The above-described value holding system may also be such that each instruction information contains an instruction ID identifying the instruction information, and the judging unit judges that the instruction is identical to the previous instruction when an instruction ID contained in the stored piece of instruction information matches an instruction ID contained in the currently received piece of instruction information.

By the above construction, it is judged that the instruction is identical to the previous instruction when the instruction ID in the stored piece of instruction information matches the instruction ID in the piece of received instruction information. Accordingly, it is possible to prevent an incorrect collection by limiting the addition or removal of the value to only once, even when the same instruction is received a second time.

The above-described value holding system may also be such that the judging unit judges that the instruction is identical to the previous instruction when a difference between the stored piece of instruction information and the currently received piece of instruction information is within a predetermined range.

By the above construction, it is judged that the instruction is identical to the previous instruction when the difference between the stored and received pieces of instruction information is within the predetermined range. Accordingly, it is possible to prevent an incorrect collection by limiting the addition or removal of the value to only once when more than one instruction is received successively with its difference less than the predetermined range.

The above-described value holding system may also be such that each instruction information contains time information indicating a time relating to the instruction, and the judging unit judges that the instruction is identical to the previous instruction when a difference between a time indicated by time information in the stored piece of instruction information and a time indicated by time information in the currently received piece of instruction information is within a predetermined range.

By the above construction, it is judged that the instruction is identical to the previous instruction when the difference between the two pieces of time information in the stored and received pieces of instruction information, respectively, is within the predetermined range. Accordingly, it is possible to prevent an incorrect collection by limiting the addition or removal of the value to only once, even when, due to errors in an instruction apparatus, more than one instruction is received successively in a short period of time.

The above-described value holding system may also be structured by a handheld device and a memory card, wherein the handheld device includes the receiving unit, and the memory card includes the judging unit and the rejecting unit.

By the above construction, the handheld device receives the instruction information, and the memory card detects an instruction which is identical to the previous instruction based on the instruction information received by the handheld device. Thus, it is possible to prevent an incorrect collection by limiting the addition or removal of the value to only once, even when the same instruction is received a second time.

The above-described value holding system may also be such that the system is a memory card.

By the above construction, the memory card rejects the instruction from an instruction apparatus when the instruction is identical to the previous instruction. Thus, it is possible to limit the addition or removal of the value to only once, even when more than one instruction is received successively due to errors in the instruction apparatus.

The above-described value holding system may also be such that the system is a handheld device.

By the above construction, the handheld device rejects the instruction from an instruction apparatus when the instruction is identical to the previous instruction. Thus, it is possible to limit the addition or removal of the value to only once, even when more than one instruction is received successively due to errors in the instruction apparatus.

A method for the above value holding system including a receiving unit, a judging unit, and a rejecting unit, comprises a receiving step in which the receiving unit receives an instruction to add or remove a value relating to a payment, a judging step in which the judging unit judges whether the instruction has been previously received, and a rejecting step in which the rejecting unit rejects the instruction when the instruction is judged to have been previously received.

By the above construction, the instruction is rejected when the instruction from an instruction apparatus is identical to the previous instruction. Accordingly, it is possible to limit the addition or removal of the value to only once, even when more than one instruction is received successively due to errors in the instruction apparatus.

A program for the above value holding system including a receiving unit, a judging unit, and a rejecting unit, comprises a receiving step in which the receiving unit receives an instruction to add or remove a value relating to a payment, a judging step in which the judging unit judges whether the instruction has been previously received, and a rejecting step in which the rejecting unit rejects the instruction when the instruction is judged to have been previously received.

By the above construction, the instruction is rejected when the instruction from an instruction apparatus is identical to the previous instruction. Accordingly, it is possible to limit the addition or removal of the value to only once, even when more than one instruction is received successively due to errors in the instruction apparatus.

A transaction system according to the present invention is structured by an instruction apparatus and the above-described value holding system comprising a receiving unit operable to receive an instruction operable to add or remove a value relating to a payment, a judging unit operable to judge whether the instruction is identical to an instruction that has been previously received, and a rejecting unit operable to reject the instruction when the judging unit judges that the instruction is identical to the previous instruction.

By the above construction, the instruction is rejected when the instruction from an instruction apparatus is identical to the previous instruction. Accordingly, it is possible to limit the addition or removal of the value to only once, even when more than one instruction is received successively due to errors in the instruction apparatus.

The above-described transaction system may also be such that the value holding system is a memory card.

By the above construction, the instruction is rejected when the instruction from an instruction apparatus is identical to the previous instruction. Accordingly, it is possible to limit the addition or removal of the value to only once, even when more than one instruction is received successively due to errors in the instruction apparatus.

The above-described transaction system may also be such that the value holding system is a handheld device.

By the above construction, the instruction is rejected when the instruction from an instruction apparatus is identical to the previous instruction. Accordingly, it is possible to limit the addition or removal of the value to only once, even when more than one instruction is received successively due to errors in the instruction apparatus.

The above-described transaction system may also be such that the value holding system is structured by a handheld device and a memory card, where the handheld device includes the receiving unit, and the memory card includes the judging unit and the rejecting unit.

By the above construction, the handheld device receives the instruction information, and the memory card detects an instruction which is identical to the previous instruction based on the instruction information received by the handheld device. Thus, it is possible to limit the addition or removal of the value to only once, even when the same instruction is received a second time.

The above-described value holding system may also be such that the value is equivalent to an amount of points, and the receiving unit receives, as the instruction, instruction information that indicates adding or removing the amount of points shown by the value.

By the above construction, the instruction is rejected when the instruction to add or remove the value indicating the points is identical to the previously received instruction. Accordingly, it is possible to prevent an incorrect addition or removal of points by limiting the addition or removal of the amount of points to only once, even when the same instruction is received a second time due to errors in an instruction apparatus.

BRIEF DESCRIPTION OF THE DRAWINGS

These and other objects, advantages and features of the present invention will become more apparent from the following detailed description when taken in conjunction with the accompanying drawings which illustrate specific embodiments of the invention.

FIG. 11 is a flowchart showing an entire transaction.

DETAILED DESCRIPTION OF THE PREFERRED EMBODIMENTS

The following describes preferred embodiments of the present invention with reference to the drawings. A term "service" in the specification is a concept including sales.

First Embodiment 1-1 Structure

A value holding system 1 of the First Embodiment according to the present invention is explained below with reference to the drawings.

Figure 1:
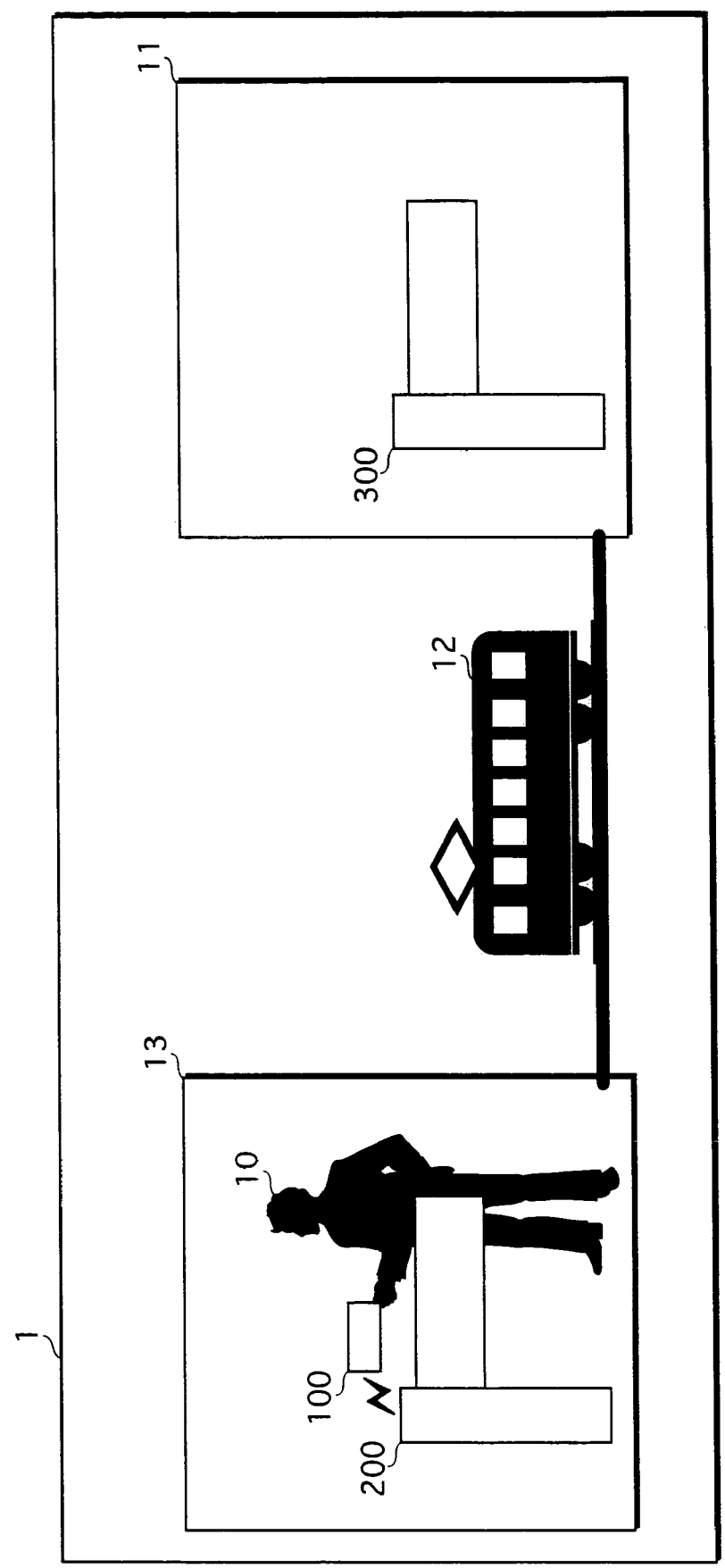
FIG. 1 illustrates a structure of a fare adjustment system in a railway company.

FIG. 1 illustrates a structure of the value holding system 1 in a railway company. A user 10 travels from a boarding station 11 to a destination station 13 by taking a train 12.

Each of the boarding station 11, the destination station 13, and other stations (not shown in FIG. 1) that are provided by the railway company is assigned, in advance, with unique station ID information for identifying the station. Further, at least one automatic ticket gate, as an instruction apparatus, is provided to each station. Each automatic ticket gate has a flap door, and stores the station ID information of the station to which the automatic ticket gate is provided as well as unique gate ID information for identifying the automatic ticket gate. In the present embodiment, an automatic ticket gate 300 is provided to the boarding station 11, and an automatic ticket gate 200 is provided to the destination station 13.

A memory card 100 is a payment processing device, which is a contactless memory card with a prepaid card and commuter pass functionalities and which is issued by the railway company. The user 10 obtains the memory card 100 from the railway company in an exchange for a predetermined amount of payment.

The user 10 carries the memory card 100 when taking the train 12.

When the user 10 attempts to go through the automatic ticket gate 300 and enter the boarding station 11 in order to take the train 12, the user 10 holds the memory card 100 toward the automatic ticket gate 300. Information is transmitted wirelessly between the memory card 100 and the automatic ticket gate 300, and the flap door of the automatic ticket gate 300 opens if the automatic ticket gate 300 judges that the user 10 is allowed to enter based on the transmitted information. The user 10 enters the boarding station 11 after the flap door is open. The user 10 then takes the train 12 and travels from the boarding station 11 to the destination station 13.

At the destination station 13, when the user 10 attempts to go through the automatic ticket gate 200 and exit the destination station 13, the user 10 holds the memory card 100 toward the automatic ticket gate 200. Information is transmitted wirelessly between the memory card 100 and the automatic ticket gate 200, and the flap door of the automatic ticket gate 200 opens if the automatic ticket gate 200 judges that the user 10 is allowed to exit based on the transmitted information.

When the user 10 takes the train 12 over a zone which is specified by the memory card 100 as a commuter pass, an additional fare is charged. The additional fare is adjusted by using the prepaid card functionality of the memory card 100.

An operation for the fare adjustment is detailed below.

1-1-1 Memory Card 100

Figure 2:
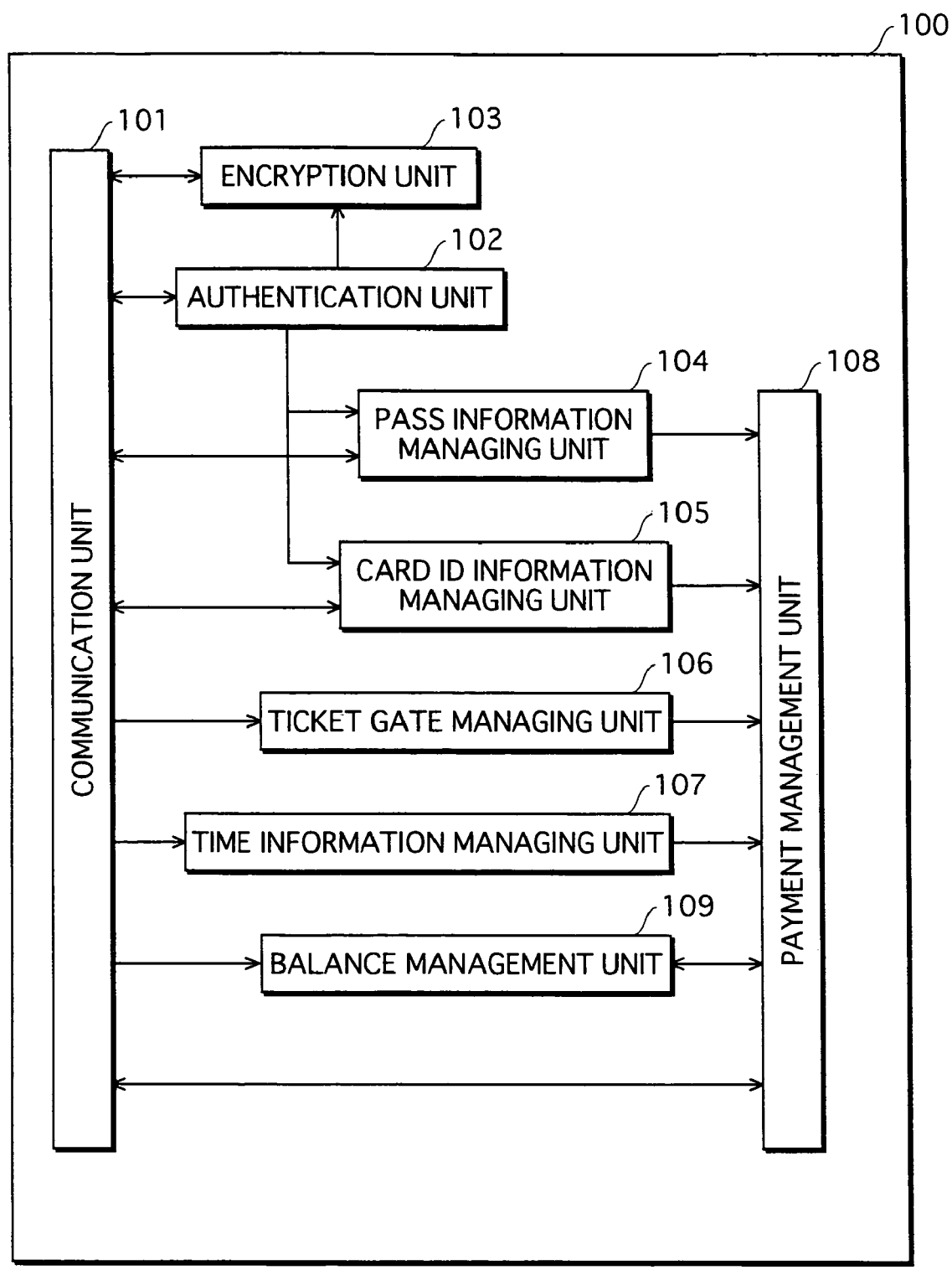
FIG. 2 is a block diagram illustrating a structure of a memory card.

The memory card 100 is structured as hardware by a CPU, a ROM storing a computer program, a RAM, and such. The memory card 100 realizes its function by the CPU operating according to the program stored in the ROM. FIG. 2 is a block diagram illustrating a structure of the memory card 100.

[Communication Unit 101]

A communication unit 101 transmits and receives information wirelessly with the automatic ticket gate 200.

[Authentication Unit 102]

An authentication unit 102 performs mutual authentication and sharing of a key with the automatic ticket gate 200 via the communication unit 101. Details of the mutual authentication and the sharing of the key will be described later.

When the mutual authentication and the sharing of the key are successfully completed, the authentication unit 102 transmits an authentication completion notification to a pass information management unit 104 and a card ID information management unit 105.

[Encryption Unit 103]

An encryption unit 103 encrypts and decrypts the information that is transmitted between the communication unit 101 and the automatic ticket gate 200.

When the mutual authentication and the sharing of the key are successfully completed, the encryption unit 103 obtains a session key K' from the authentication unit 102. In the transmission of the information to the automatic ticket gate 200 after the successful completion of the mutual authentication and the sharing of the key, the encryption unit 103 encrypts the information to be transmitted by using the session key K', and then the communication unit 101 transmits the encrypted information. Further, information that the communication unit 101 received from the automatic ticket gate 200 after the successful completion of the mutual authentication and the sharing of the key is used for an internal process of the memory card 100 after the encryption unit 103 decrypts the received information by using the session key K'.

In order to keep the description simple, encryption of information before transmitting the information is always included in an operation which is described herein by terms such as "transmit the information via the communication unit 101". Therefore, such terms indicate that the encryption unit 103 encrypts the information to be transmitted and then the communication unit 101 transmits the encrypted information. Similarly, decryption of information after receiving the information is always included in an operation which is described herein by terms such as "receive the information via the communication unit 101". Therefore, such terms indicate that the communication unit 101 receives the information and then the encryption unit 103 decrypts the received information.

[Pass Information Management Unit 104]

The pass information management unit 104 stores and manages valid zone information indicating a zone within which the memory card as a commuter pass is valid. The valid zone information is made of zone start information and zone end information. The pass information management unit 104, after receiving the authentication completion notification, receives boarding station information from the automatic ticket gate 300 at the boarding station 11, and stores the boarding station information. The boarding station information indicates station ID information corresponding to the boarding station 11. The pass information management unit 104 also receives destination station information from the automatic ticket gate 200 at the destination station 13 when the user 10 attempts to exit the station. The destination station information indicates station ID information corresponding to the destination station 13. Each of the zone start information, the zone end information, the boarding station information, and the destination station information is a predetermined integer.

Upon reception of the destination station information, the pass information management unit 104 judges if the user 10 has taken the train 12 within or over the zone which is specified by the valid zone information, based on the zone start information, the zone end information, the boarding station information, and the destination station information. When both of the boarding station information and destination station information are equal to or between the zone start information and the zone end information, the pass information management unit 104 judges that the user 10 has taken the train 12 within the zone in which the memory card as the commuter pass is valid, i.e. "in-zone". When either of the boarding station information or the destination station information is smaller than the zone start information or larger than the zone end information, the pass information management unit 104 judges that the user 10 has taken the train 12 over the zone in which the memory card as the commuter pass is valid, i.e. "out-zone".

A more specific explanation is given below, taking a case in which the zone start information is 10 and the zone end information is 20, for example. In this case, if the station information for the boarding station 11 is 12, and the station information for the destination station 13 is 15, then the pass information management unit 104 judges that the user 10 has taken the train 12 within the zone. If the station information for the boarding station 11 is 12, but the station information for the destination station 13 is 22, then the pass information management unit 104 judges that the user 10 has taken the train 12 over the zone.

When the pass information management unit 104 judges that the user 10 has taken the train 12 within the zone, the pass information management unit 104 transmits, to a payment management unit 108, boarding zone information indicating "in-zone". When the pass information management unit 104 judges that the user 10 has taken the train 12 over the zone, the pass information management unit 104 transmits, to the payment management unit 108, the boarding zone information indicating "out-zone".

Further, when receiving the authentication completion notification from the authentication unit 102, the pass information management unit 104 transmits the valid zone information and the boarding station information to the automatic ticket gate 200 via the communication unit 101.

[Card ID Information Management Unit 105]

The card ID information management unit 10S stores unique card ID information for identifying the memory card.

The card ID information management unit 105 receives the authentication completion notification from the authentication unit 102. When the authentication completion notification is received, the card ID information management unit 105 transmits the card ID information to the automatic ticket gate 200 via the communication unit 101.

The card ID information management unit 10S also receives card specifying information from the automatic ticket gate 200 via the communication unit 101. The card specifying information indicates the card ID information of a card which the automatic ticket gate 200 recognizes as a billing card. When the card specifying information is received, the card ID information management unit 105 judges if the transmitted card ID information and the received card specifying information are identical.

When the card ID information management unit 105 judges that the transmitted card ID information and the received card specifying information are identical, the card ID information management unit 105 transmits communication information indicating a successful communication to the payment management unit 108. When the card ID information management unit 105 judges that the transmitted card ID information and the received card specifying information are not identical, the card ID information management unit 105 indicates that the card ID information management unit 110 received a payment request for a different memory card, and the card ID information management unit 105 transmits communication information indicating a communication error to the payment management unit 108.

[Ticket Gate Management Unit 106]

A ticket gate management unit 106 receives the gate ID information from the automatic ticket gate 200 via the communication unit 101.

The ticket gate management unit 106 stores previously received gate ID information as ticket gate history. Contents of the ticket gate history are deleted when the pass information management unit 104 receives the boarding station information.

When the gate ID information is received, the ticket gate management unit 106 judges if the gate ID information and the ticket gate history are identical.

When the ticket gate management unit 106 judges that the gate ID information matches the ticket gate history, the ticket gate management unit 106 judges that the memory card 100 successively communicates with the same automatic ticket gate, and transmits the communication information indicating a communication error to the payment management unit 108. When the ticket gate management unit 106 judges that the gate ID information and the ticket gate history are not identical, the ticket gate management unit 106 transmits the communication information indicating a successful communication to the payment management unit 108.

[Time Information Management Unit 107]

A time information management unit 107 stores valid period information indicating a period during which the memory card as the commuter pass is effective. The valid period information is made of period start information indicating an earliest time when the user is allowed to use the card, and period end information indicating a last time when the user is allowed to use the card. In a case in which the earliest time when the user is allowed to use the card is 12:10'30, Feb. 10, 2003, the period start information is 20030210121030, and the last time when the user is allowed to use the card is 12:10'30, Mar. 10, 2003, the period end information is 20030310121030.

When the user 10 attempts to exit the destination station 13, the time information management unit 107 receives gate time information from the automatic ticket gate 200 at the destination station 13. The gate time information indicates a date and hour when the mutual authentication and the sharing of the key is completed. The gate time information is also in the same format as the period start information and the period end information.

The time information management unit 107 stores the previously received gate time information as gate time history.

Upon reception of the gate time information, the time information management unit 107 judges if the user 10 has taken the train 12 within or over the period specified by the valid period information, based on the valid period information and the gate time information. When the gate time information is equal to or between the period start information and the period end information, the time information management unit 107 judges that the user 10 has taken the train 12 during the period in which the memory card as the commuter pass is valid, i.e. "in-period". When the gate time information is smaller than the period start information or larger than the period end information, the time information management unit 107 judges that the user 10 has not taken the train 12 during the period in which the memory card as the commuter pass is valid, i.e. "out-period".

When the time information management unit 107 judges that the user 10 has taken the train 12 during the period in which the memory card as the commuter pass is valid, the time information management unit 107 transmits, to the payment management unit 108, boarding period information indicating "in-period". When the time information management unit 107 judges that the user 10 has not taken the train 12 during the period in which the memory card as the commuter pass is valid, the time information management unit 107 transmits, to the payment management unit 108, boarding period information indicating "out-period", and further judges if a difference between the gate time information and the gate time history is 5 seconds or smaller.

When the time information management unit 107 judges that the difference is 5 seconds or smaller, the time information management unit 107 judges that the memory card 100 successively communicates with the same automatic ticket gate due to an error at the automatic ticket gate 200, and transmits operation information indicating an operation error to the payment management unit 108. When the time information management unit 107 judges that the difference is larger than 5 seconds, the time information management unit 107 transmits the operation information indicating a normal operation to the payment management unit 108.

[Payment Management Unit 108]

The payment management unit 108 receives the boarding zone information from the pass information management unit 104, the communication information from each of the card ID information management unit 105 and the ticket gate management unit 106, and the boarding period information and the operation information from the time information management unit 107. The payment management unit 108 is also operable to transmit payment status information indicating one of "payable", "unpayable", and "invalid" to the automatic ticket gate 200 via the communication unit 101.

If the automatic ticket gate 200 has requested the memory card for a payment in a case in which the communication information indicates the communication error or the operation information indicates the operation error, the payment management unit 108 transmits the payment status information indicating "invalid" to the automatic ticket gate 200 via the communication unit 101. Further, if the automatic ticket gate 200 has requested the memory card for the payment when the boarding zone information and the boarding period information respectively indicate "in-zone" and "in-period", the payment management unit 108 transmits the payment status information indicating "invalid" to the automatic ticket gate 200 via the communication unit 101.

When the payment management unit 108 judges that the payment request is valid based on all of the received information, the payment management unit 108 transmits a request for payment ability information to a balance management unit 109.

When the payment management unit 108 receives, from the balance management unit 109, the payment ability information indicating "payable", the payment management unit 108 transmits the payment status information indicating "payable" to the automatic ticket gate 200 via the communication unit 101. When the received payment ability information indicates "unpayable", the payment management unit 108 transmits the payment status information indicating "unpayable" to the automatic ticket gate 200 via the communication unit 101.

[Balance Management Unit 109]

The balance management unit 109 stores balance information indicating an amount of money that is recorded in the memory card as the prepaid card. An additional explanation about the prepaid card functionality is given below.

The user 10 pays to the railway company, in advance, for an amount to be recorded in the memory card as the prepaid card. The railway company adds the prepaid amount to the amount indicated by the balance information.

When the user 10 takes the train 12 over the zone which is specified by the valid zone information, the balance management unit 109 receives additional fare information from the automatic ticket gate 200 via the communication unit 101. The additional fare information indicates an amount of an additional fare for taking the train 12 over the zone. Further, the balance management unit 109 receives the request for the payment ability information from the payment management unit 108.

When the request for the payment ability information is received, the balance management unit 109 judges if the amount indicated by the additional fare information is payable with the amount of money indicated by the balance information.

When the amount indicated by the additional fare information is equal to or smaller than the amount indicated by the balance information, the balance management unit 109 judges that the additional fare is "payable". When the amount indicated by the additional fare information is greater than the amount indicated by the balance information, the balance management unit 109 judges that the additional fare is "unpayable".

When the balance management unit 109 judges that the additional fare is "payable", the balance management unit 109 transmits the payment ability information indicating "payable" to the payment management unit 108. When the balance management unit 109 judges that the additional fare is "unpayable", the balance management unit 109 transmits the payment ability information indicating "unpayable" to the payment management unit 108.

The balance management unit 109 also receives a payment instruction from the automatic ticket gate 200 via the communication unit 101. Upon reception of the payment instruction, the balance management unit 109 deducts the amount indicated by the additional fare information from the amount indicated by the balance information, and stores an amount after the deduction as new balance information. The balance management unit 109 then transmits a paid notification to the automatic ticket gate 200 via the communication unit 101.

1-1-2 Automatic Ticket Gate 200

Figure 3:
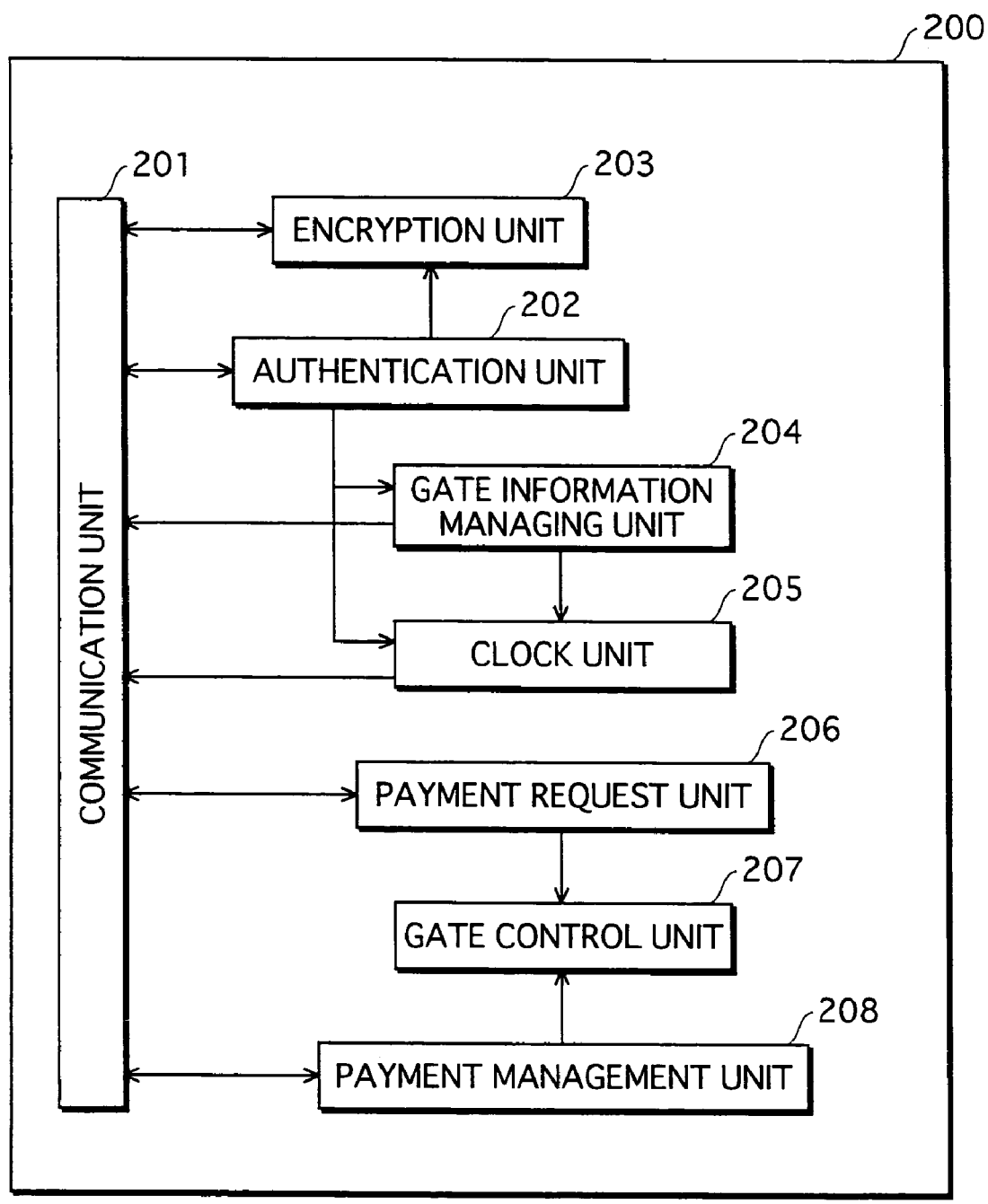
FIG. 3 is a block diagram illustrating a structure of an automatic ticket gate.

The automatic ticket gate 200 is structured as hardware by a CPU, a ROM storing a computer program, a RAM, and such. The automatic ticket gate 200 realizes its function by the CPU operating according to the program stored in the ROM. FIG. 3 is a block diagram illustrating a structure of the automatic ticket gate 200.

[Communication Unit 201]

A communication unit 201 transmits and receives information wirelessly with the memory card 100.

[Authentication Unit 202]

An authentication unit 202 performs the mutual authentication and the sharing of the key with the memory card 100 via the communication unit 201. Details of the mutual authentication and the sharing of the key will be described later.

When the mutual authentication and the sharing of the key are successfully completed, the authentication unit 202 transmits an authentication completion notification to a gate information management unit 204 and a clock unit 205.

[Encryption Unit 203]

An encryption unit 203 encrypts and decrypts the information that is transmitted between the communication unit 201 and the memory card 100.

When the mutual authentication and the sharing of the key are successfully completed, the encryption unit 203 obtains a session key K from the authentication unit 202. In the transmission of the information to the memory card 100 after the successful completion of the mutual authentication and the sharing of the key, the encryption unit 203 encrypts the information to be transmitted by using the session key K, and then the communication unit 201 transmits the encrypted information. Further, information that the communication unit 201 received from the memory card 100 after the successful completion of the mutual authentication and the sharing of the key is used for an internal process of the automatic ticket gate 200 after the encryption unit 203 decrypts the received information by using the session key K.

After the mutual authentication and the sharing of the key are successfully completed, the communication between the memory card 100 and the automatic ticket gate 200 is always performed by using the encrypted information as described above. In order to keep the description simple, encryption of information before transmitting the information is always included in an operation which is described herein by terms such as "transmit the information via the communication unit 201". Therefore, such terms indicate that the encryption unit 203 encrypts the information to be transmitted and then the communication unit 201 transmits the encrypted information. Similarly, decryption of information after receiving the information is always included in an operation which is described herein by terms such as "receive the information via the communication unit 201". Therefore, such terms indicate that the communication unit 201 receives the information and then the encryption unit 203 decrypts the received information.

[Gate Information Management Unit 204]

A gate information management unit 204 stores the station ID information and the gate ID information in advance.

Upon reception of the authentication completion notification from the authentication unit 202, the gate information management unit 204 transmits the station ID information and the gate ID information to the memory card 100 via the communication unit 201.

[Clock Unit 205]

A clock unit 205 is a clock to keep time. Upon reception of the authentication completion notification from the authentication unit 202, the clock unit 205 transmits the gate time information indicating the time when the authentication completion notification is received by the memory card 100 via the communication unit 201.

[Payment Request Unit 206]

A payment request unit 206 transmits the additional fare information to the memory card 100.

The payment request unit 206 stores a fare table in advance which indicates a fare between any pair of stations that are indicated by a different piece of station ID information. The fare table is a table in which the fare and two pieces of the station ID information for the pair of stations correspond to each other. The station ID information and the fare are each integers. The fare table includes, for example, three numbers 3, 10, and 200 that correspond to each other, which indicates that the fare is 200 yen when the user takes a train from a station whose station ID information is 3 to another station whose station ID information is 10.

The payment request unit 206 receives the valid zone information, the valid period information, and the boarding station information from the memory card 100 via the communication unit 201. The payment request unit 206 judges if the date and hour indicated by the gate time information are within the period indicated by the valid period information.

If the payment request unit 206 judges that the date and hour indicated by the gate time information are not within the period indicated by the valid period information, the payment request unit 206 transmits, to the memory card 100 via the communication unit 201, the additional fare information indicating the fare between the stations indicated by the boarding station information and the destination station information.

If the payment request unit 206 judges that the date and hour indicated by the gate time information are within the period indicated by the valid period information, the payment request unit 206 judges if the station ID information is over the zone by using the station ID stored in the information gate information management unit 204 and the valid zone information.

When the payment request unit 206 judges that the station ID information is over the zone, the payment request unit 206 calculates an amount to be paid by the user 10 based on the fare table, and transmits, to the memory card 100 via the communication unit 201, the additional fare information corresponding to the calculated amount.

Further, when the payment request unit 206 judges that the station ID information is within the zone, the payment request unit 206 transmit a gate opening instruction to a gate control unit 207.

[Gate Control Unit 207]

The gate control unit 207 controls gating of the flap door.

The gate control unit 207 receives one of the gate opening instruction from the payment request unit 206 and a gate closing instruction from a payment management unit 208. If the door is closed when the gate opening instruction is received, the gate control unit 207 opens the flap door. If the door is open when the gate closing instruction is received, the gate control unit 207 closes the flap door.

[Payment Management Unit 208]

The payment management unit 208 receives, from the memory card 100 via the communication unit 201, the payment status information that indicates one of "payable", "unpayable, and "invalid".

When the payment status information indicates "payable", the payment management unit 208 transmits the payment instruction to the memory card 100 via the communication unit 201. When the payment status information indicates "unpayable", the payment management unit 208 transmits the gate closing instruction to the gate control unit 207.

When the payment status information indicates "invalid", the payment management unit 208 finishes the operation.

1-2 Operation

Figure 4:
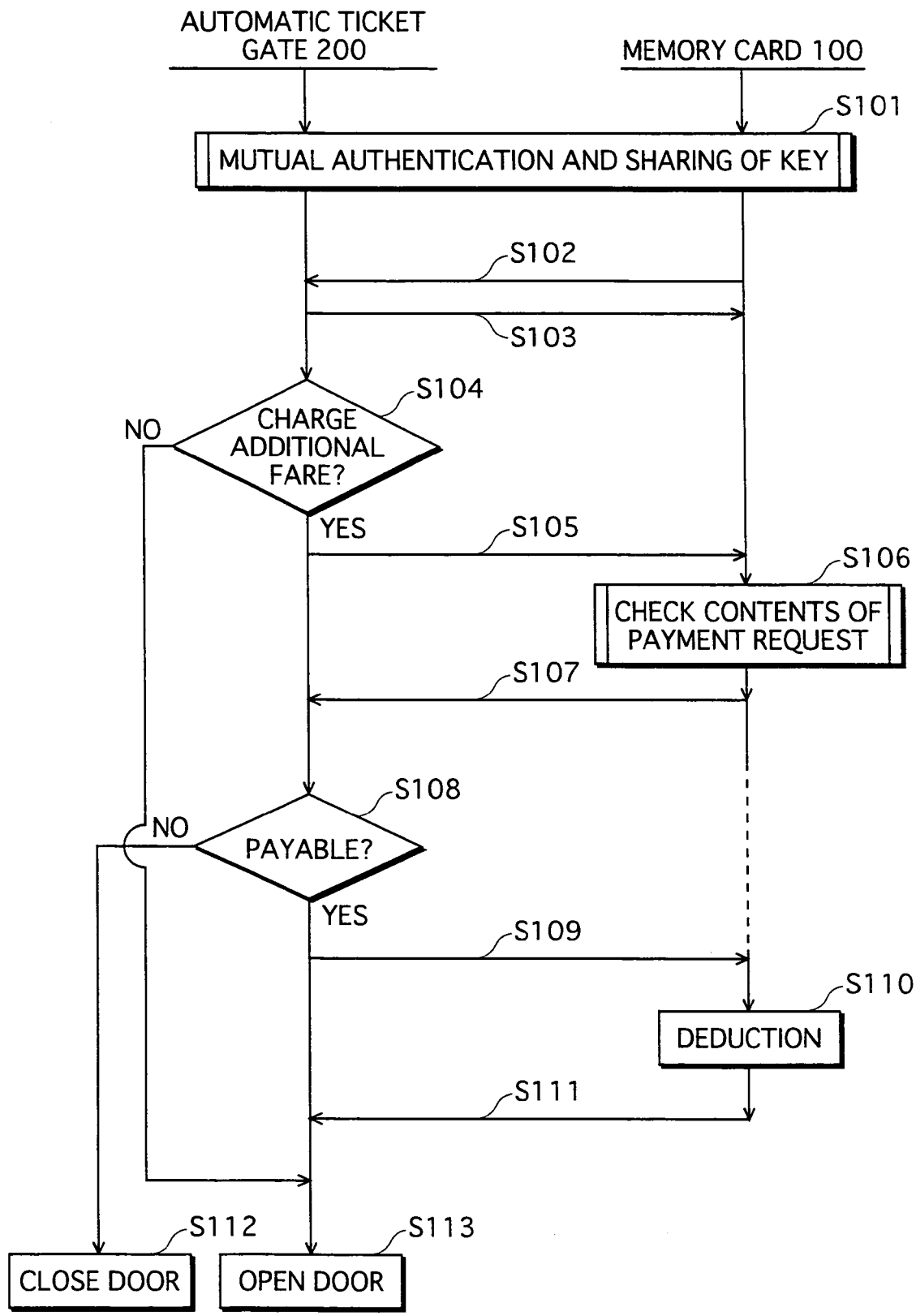
FIG. 4 is a flowchart showing an entire transaction of a fare adjustment.

FIG. 4 is a flowchart showing an entire transaction of the fare adjustment.

The memory card 100 and the automatic ticket gate 200 perform the mutual authentication and the sharing of the key (Step S101).

Figure 5:
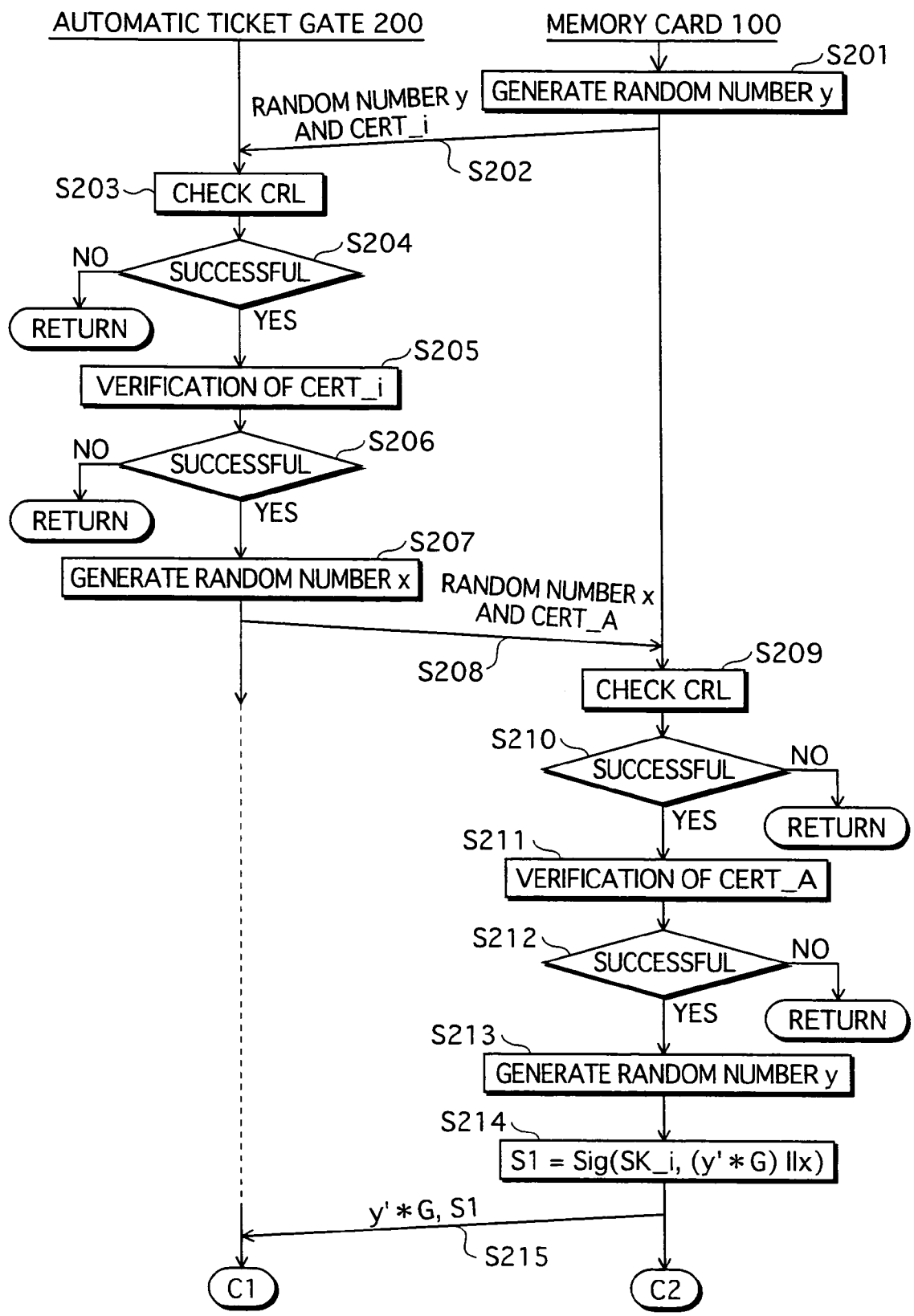
FIG. 5 is a flowchart showing an operation of the mutual authentication of devices and the sharing of a key.
Figure 6:
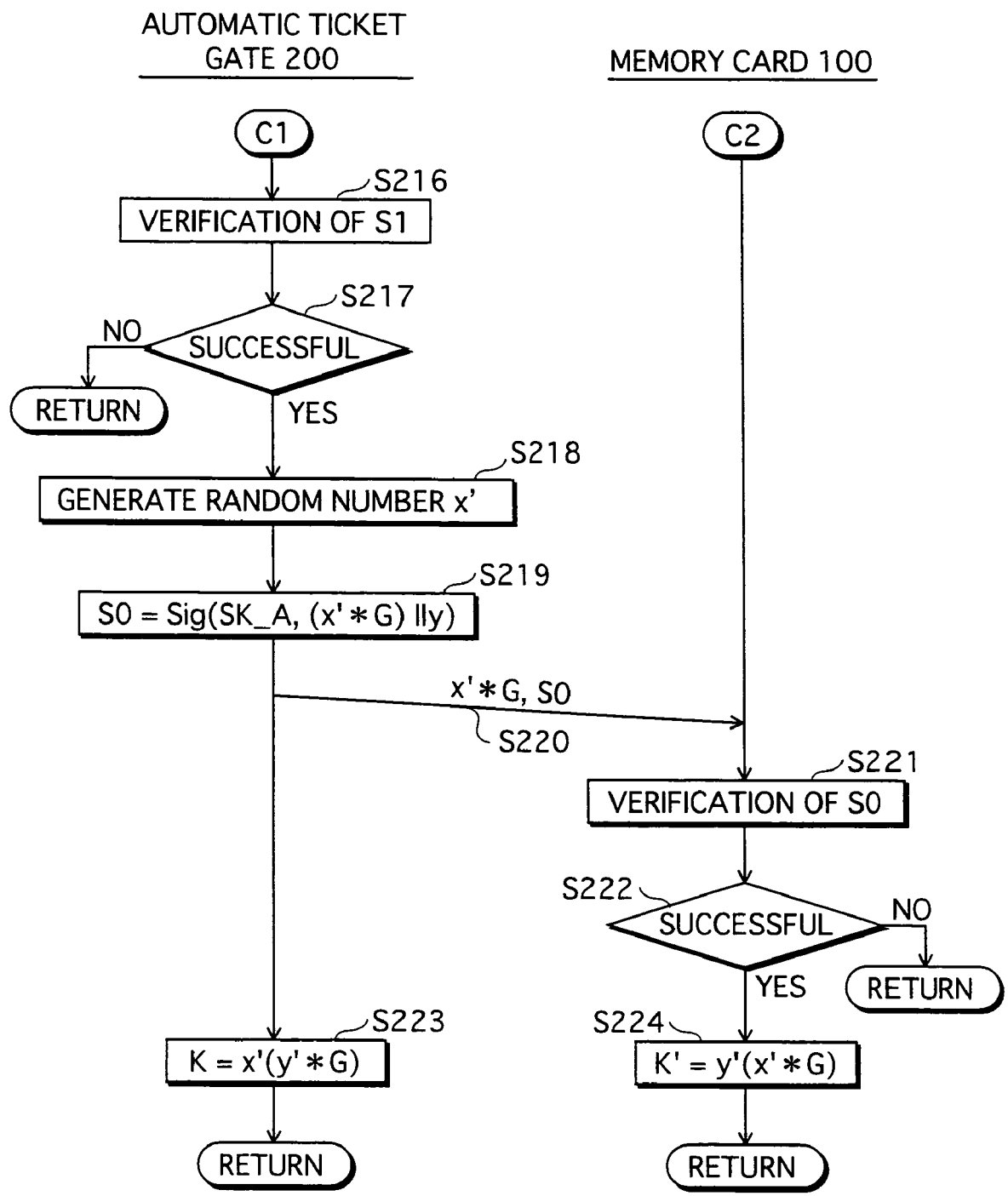
FIG. 6 is a flowchart showing another operation of the mutual authentication of devices and the sharing of a key.

The mutual authentication and the sharing of the key between the authentication unit 202 of the automatic ticket gate 200 and the authentication unit 102 of the memory card 100 is explained in detail with reference to the flowcharts in FIGS. 5 and 6.

The authentication unit 202 of the automatic ticket gate 200 records a public key PK-CA, a secret key SK-A, and a public key certification Cert-A issued by a Certificate Authority (CA) in advance, and includes an encrypting unit that uses an elliptic curve E. The authentication unit 102 of the memory card 100 records the public key PK-CA, a secret key SK-i, and the public key certification Cert-i issued by a Certificate Authority (CA) in advance, and the authentication unit 201 includes an encrypting unit that uses the elliptic curve E.

"Sig(SK,D)" is an equation used for calculation to apply a digital signature by using the secret key SK. "G" is a base point on the elliptic curve E, and a unique value for this authentication system. "*" is an operator that indicates a multiplication on the elliptic curve E. For example, "x*G" is an equation for adding the point G on the elliptic curve E for x number of times. "||" is an operator that indicates a join. For example, "A||B" shows a result of joining of A and B.

Terms such as "the authentication unit 202 outputs the information to the authentication unit 102" and "the authentication unit 102 outputs the information to the authentication unit 202" are a simplified description, and these terms mean "the authentication unit 202 outputs the information to the authentication unit 102 via the communication unit 201 and communication unit 101" and "the authentication unit 102 outputs the information to the authentication unit 202 via the communication unit 101 and communication unit 201", respectively.

The authentication unit 102 generates a random number y (Step S201), and outputs the generated random number y and the public key certification Cert-i to the authentication unit 202 (Step S202).

The authentication unit 202 receives the random number y and the public key certification Cert-i (Step S202), and checks if the public key certification Cert-i of the memory card 100 has been revoked by using a Certificate Revocation List (CRL) (Step S203). If the public key certification Cert-i has been revoked (Step S204), the operation ends.

If the public key certification Cert-i is not revoked (Step S204), the authentication unit 202 verifies the public key certification Cert-i by using the public key PK-CA (Step S205). If the verification is not successful (Step S206), the authentication unit 202 finishes the operation.

If the verification is successful (Step S206), the authentication unit 202 generates a random number x (Step S207), and outputs the generated random number x and the public key certification Cert-A to the authentication unit 102 (Step S208).

The authentication unit 102 receives the random number x and the public key certification Cert-A from the authentication unit 202 (Step S208). Next, the authentication unit 102 checks if the public key certification Cert-A of the automatic ticket gate 200 has been revoked by using the CRL (Step S209). If the public key certification Cert-A has been revoked (Step S210), the operation ends.

If the public key certification Cert-A is not revoked (Step S210), the authentication unit 102 verifies the public key certification Cert-A by using the public key PK-CA (Step S211). If the verification is not successful (Step S212), the authentication unit 102 finishes the operation.

If the verification is successful (Step S212), the authentication unit 102 generates a random number y' (Step S213), generates a signature data S1=Sig(SK-i,(y'*G)∥x) (Step S214), and outputs y'*G and S1 to the authentication unit 202 (Step S215). The authentication unit 202 receives y'*G and S1 from the authentication unit 102 (Step S215). Then, the authentication unit 202 verifies S1 (Step S216). If the verification is not successful (Step S217), the authentication unit 202 finishes the operation.

If the verification is successful (Step S217), the authentication unit 202 generates a random number x' (Step S218), generates a signature data S0=Sig(SK-A,(x'*G)∥y) (Step S219), and outputs x'*G and S0 to the authentication unit 102 (Step S220).

The authentication unit 102 receives x'*G and S0 from the authentication unit 202 (Step S220). Next, the authentication unit 102 verifies S0 (Step S221). If the verification is not successful (Step S222), the authentication unit 102 finishes the operation.

If the verification is successful (Step S222), the authentication unit 102 calculates the session key K'=y'(x'*G) (Step S223).

On the other hand, the authentication unit 202 calculates the session key K=x'(y'*G) (Step S224).

In this way, the mutual authentication and the sharing of the key between the automatic ticket gate 200 and the memory card 100 are performed.

The session keys K and K' are keys having a shared value between the automatic ticket gate 200 and the memory card 100, respectively.

Referring back to FIG. 4, when the authentication of Step S101 is successful, the memory card 100 transmits the valid zone information, the valid period information, the card ID information, and the boarding station information to the automatic ticket gate 200 (Step S102).

Further, when the authentication of Step S101 is successful, the automatic ticket gate 200 transmits the destination station information, the gate ID information, and the gate time information to the memory card 100 (Step S103).

The automatic ticket gate 200 judges if it is necessary to charge the additional fare based on the received zone information, the valid period information, and the boarding station information (Step S104). The operation proceeds to Step S113 if the automatic ticket gate 200 judges that it is not necessary to charge the additional fare.

If the automatic ticket gate 200 judges that it is necessary to charge the additional fare, the automatic ticket gate 200 transmits the additional fare information and the card specifying information to the memory card 100 so as to request the memory card 100 for the payment (Step S105). The memory card 100 receives the additional fare information and the card specifying information and checks the contents of the payment request (Step S106).

Figure 7:
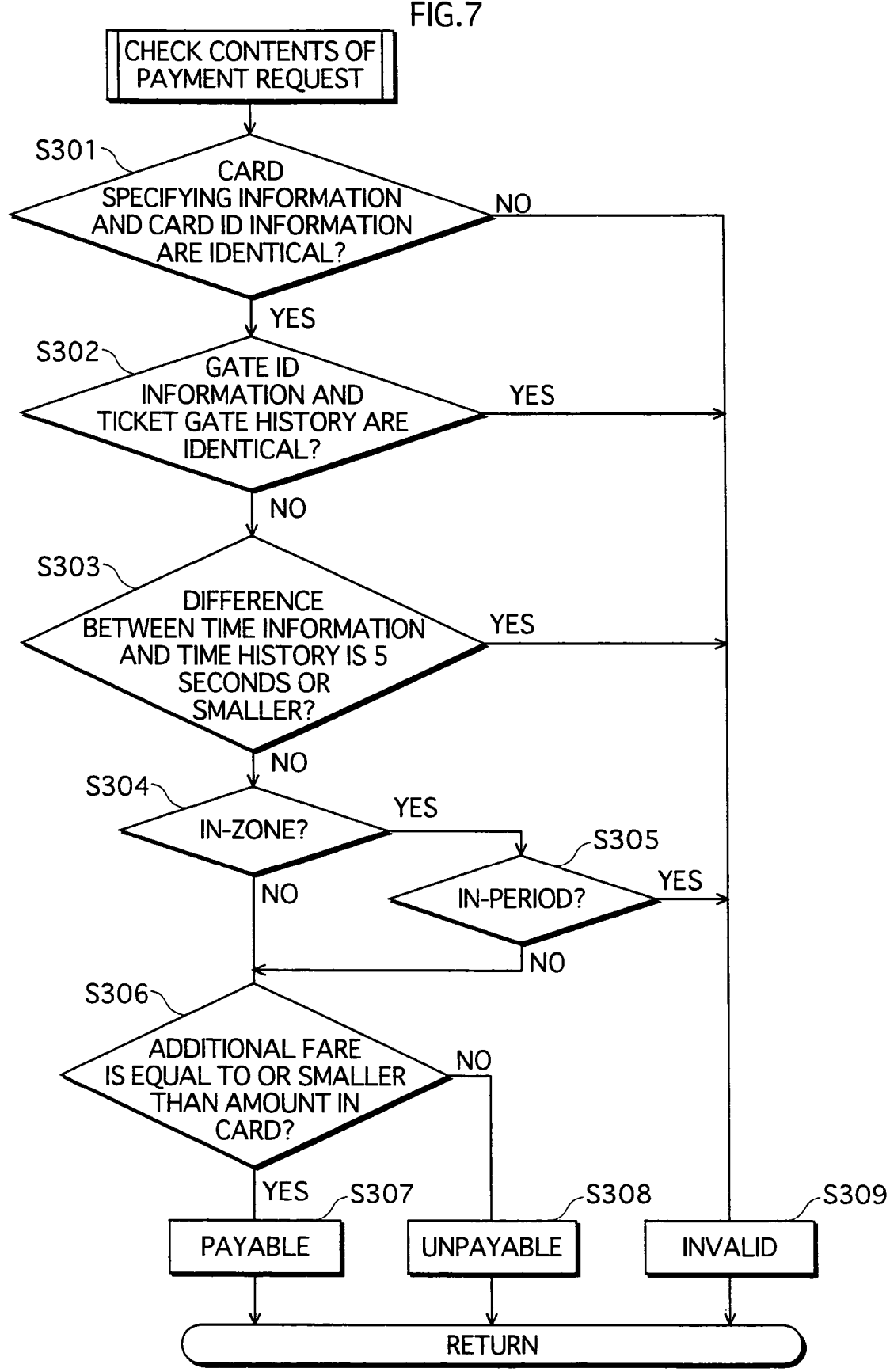
FIG. 7 is a flowchart showing an operation of checking the contents of a payment request.

FIG. 7 is a flowchart explaining the operation of Step S106 in detail.

The card ID information management unit 105 judges if the card specifying information matches the card ID information (Step S301). When the card ID information management unit 105 judges that the card specifying information does not match the card ID information, the operation proceeds to Step S309. When the card ID information management unit 105 judges that the card specifying information matches the card ID information, the operation proceeds to Step S302.

The ticket gate management unit 106 judges if the gate ID information matches the ticket gate history (Step S302). When the ticket gate management unit 106 judges that the gate ID information matches the ticket gate history, the operation proceeds to Step S309. When the ticket gate management unit 106 judges that the gate ID information does not match the ticket gate history, the operation proceeds to Step S303.

The time information management unit 107 judges if the difference between the gate time information and the gate time history is 5 seconds or smaller (Step S303). When the time information management unit 107 judges that the difference between the gate time information and the gate time history is 5 seconds or smaller, the operation proceeds to Step S309. When the time information management unit 107 judges that the difference between the gate time information and the gate time history is greater than 5 seconds, the operation proceeds to Step S304.

The pass information management unit 104 judges if the station ID information is within or over the zone which is specified by the valid zone information (Step S304). When the pass information management unit 104 judges that the station ID information is within the zone, the pass information management unit 104 further judges if the user 10 has taken the train 12 within or over the period specified by the valid period information (Step S305). When the pass information management unit 104 judges the user 10 has taken the train 12 within the period in Step S305, the operation proceeds to Step S306. When the pass information management unit 104 judges the user 10 has taken the train 12 over the period in Step S305, the operation proceeds to Step S309. When the pass information management unit 104 judges that the station ID information is over the zone in Step S304, the operation proceeds to Step S306.

The balance management unit 109 judges if the additional fare is payable or unpayable (Step S306). When the balance management unit 109 judges that the additional fare is larger than the amount remaining in the card, the operation proceeds to Step S308. When the balance management unit 109 judges that the additional fare is equal to or smaller than the amount remaining in the card, the operation proceeds to Step S307.

The memory card 100 generates the payment status information indicating "payable" (Step S307).

The memory card 100 generates the payment status information indicating "unpayable" (Step S308).

The memory card 100 generates the payment status information indicating "invalid" (Step S309).

The memory card 100 transmits the generated payment status information to the automatic ticket gate 200 (Step S107).

The automatic ticket gate 200 receives the payment status information (Step S108).

When the received payment status information indicates "invalid", the automatic ticket gate 200 finishes the operation. When the received payment status information indicates "unpayable", the operation proceeds to Step S112. When the received payment status information indicates "payable", the automatic ticket gate 200 transmits the payment instruction to the memory card 100 (Step S109).

The memory card 100 receives the payment instruction (Step S110). The memory card 100 deducts the additional fare from the balance information. The memory card 100 transmits the paid notification to the automatic ticket gate 200 (Step S111).

The automatic ticket gate 200 closes the flap door provided thereto, and finishes the operation (Step S112).

The automatic ticket gate 200 opens the flap door provided thereto, and finishes the operation (Step S1113).

Second Embodiment 2-1 Structure

Figure 8:
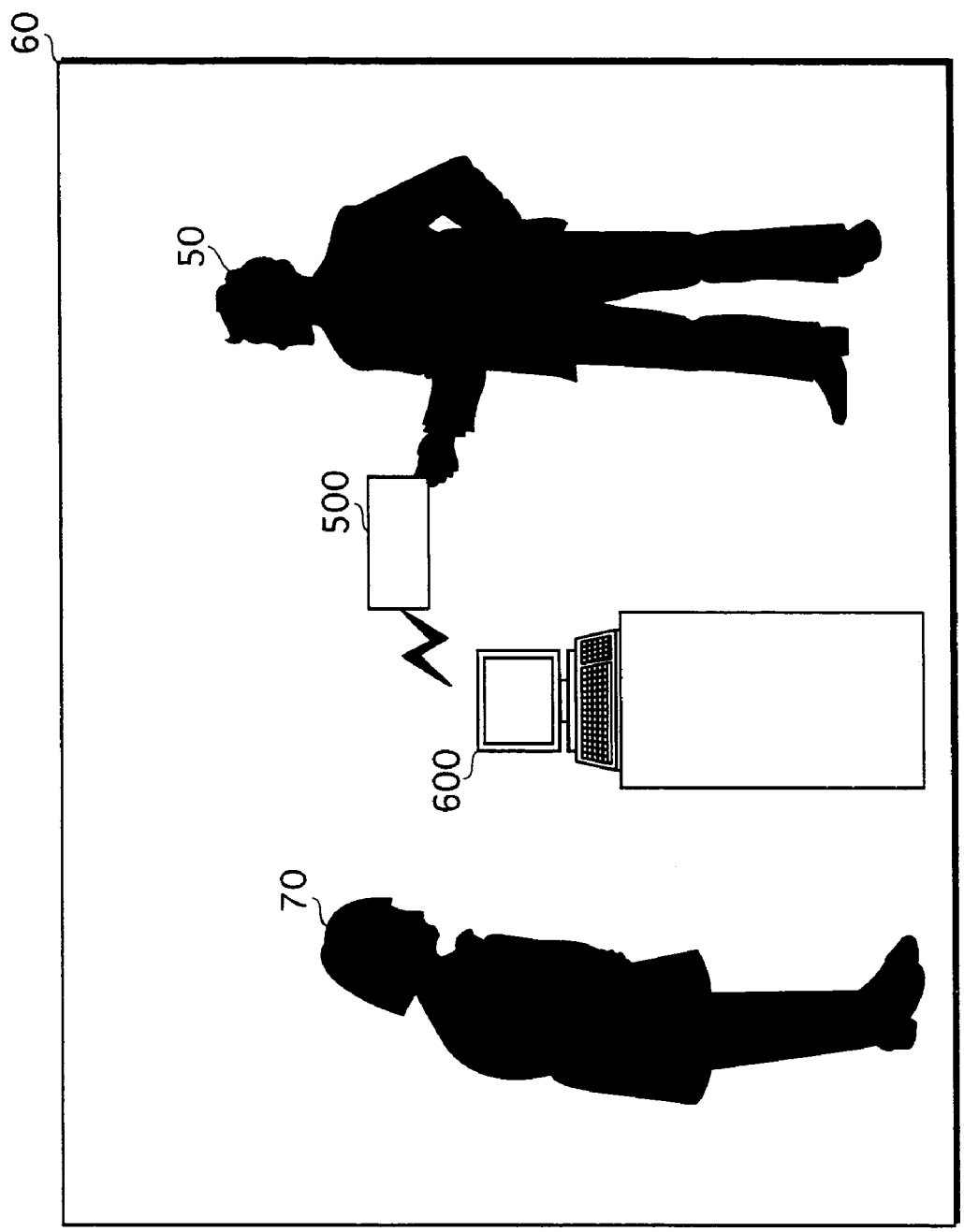
FIG. 8 illustrates a structure of a transaction system.

A value holding system 2 of the Second Embodiment according to the present invention is explained below with reference to the drawings. FIG. 8 illustrates a structure of the value holding system 2.

A user 50 carries a memory card 500 when shopping in a shop 60. The memory card 500 is a contactless memory card with prepaid card functionality issued by a company that runs the shop 60.

The user 50 brings an article to be purchased to a checkout counter of the shop 60. A cash register 600 is placed at the checkout counter, and a cashier 70 operates the cash register 600. The cash register 600 stores register ID information for identifying the cash register.

The cashier 70 has a barcode reader provided to the cash register 600 for reading a barcode attached to the article. Then, the cashier 70 presses a calculation button provided to the cash register 600.

The cash register 600 calculates an amount of money to be paid by the user 50 in exchange for the article. The cash register 600 wirelessly transmits, to the memory card 500, instruction information indicating a payment request for the calculated amount of money.

The memory card 500 performs a payment operation of the calculated amount of money based on the received instruction information by using the prepaid card functionality. In the payment operation, the memory card 500 rejects the payment request in a case in which the payment request for the amount of money, which is transmitted to the memory card 500 from the cash register, is identical to a previous payment request.

The payment processing operation is detailed below.

2-1-1 Memory Card 500

Figure 9:
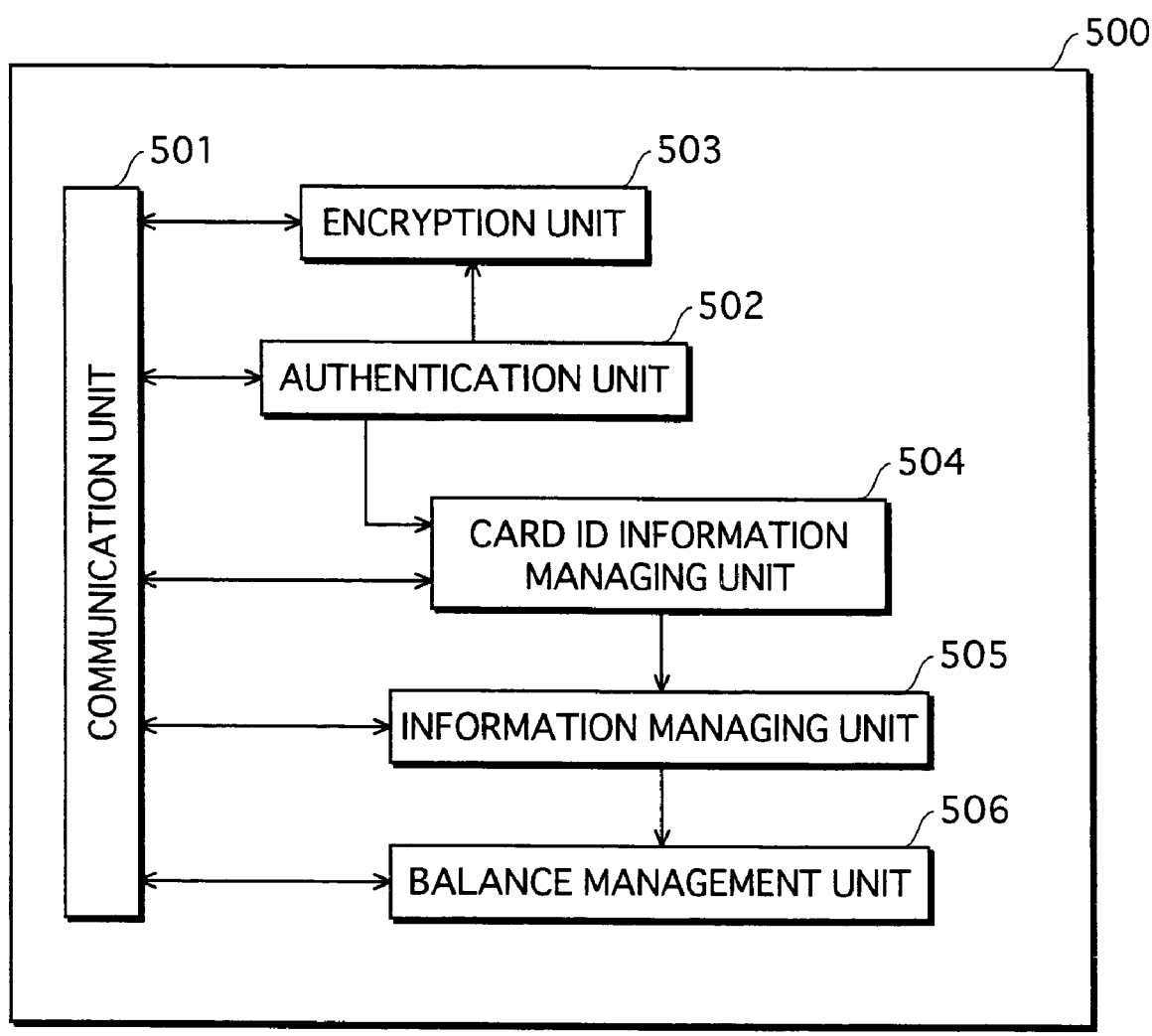
FIG. 9 is a block diagram illustrating a structure of a memory card.

The memory card 500 is structured as hardware by a CPU, a ROM storing a computer program, a RAM, and such. The memory card 500 realizes its function by the CPU operating according to the program stored in the ROM. FIG. 9 is a block diagram illustrating a structure of the memory card 500.

[Communication Unit 501]

The communication unit 501 transmits and receives information wirelessly with the cash register 600.

[Authentication Unit 502]

An authentication unit 502 performs mutual authentication and sharing of a key with the cash register 600 via the communication unit 501. The mutual authentication and the sharing of the key are the same operation as in Step S101 explained above, and are not detailed here.

The operation of the mutual authentication and the sharing of the key may also be described with reference to FIG. 5 by replacing the automatic ticket gate 200 with the cash register 600 and replacing the memory card 100 with the memory card 500.

When the mutual authentication and the sharing of the key are successfully completed, the authentication unit 502 transmits an authentication completion notification to a card ID information management unit 504.

[Encryption Unit 503]

An encryption unit 503 encrypts and decrypts the information transmitted.

When the mutual authentication and the sharing of the key are successfully completed, the encryption unit 503 obtains a session key K' from the authentication unit 502.

After the successful completion of the mutual authentication and the sharing of the key by the authentication unit 502, the communication between the memory card 500 and the cash register 600 is always performed with the information being encrypted. In the transmission of the information to the cash register 600 after the successful completion of the mutual authentication and the sharing of the key, the encryption unit 503 first encrypts the information to be transmitted by using the session key K', and then the communication unit 501 transmits the encrypted information. Further, information that the communication unit 501 received from the cash register 600 after the successful completion of the mutual authentication and the sharing of the key is used for an internal process of the memory card 500 after the encryption unit 503 decrypts the received information by using the session key K'.

[Card ID Information Management Unit 504]

The card ID information management unit 504 stores unique card ID information for identifying the memory card.

The card ID information management unit 504 receives the authentication completion notification from the authentication unit 502. When the authentication completion notification is received, the card ID information management unit 504 transmits the card ID information to the cash register 600 via the communication unit 501.

The card ID information management unit 504 also receives card specifying information from the cash register 600 via the communication unit 501. The card specifying information is card ID information indicating a card which the cash register 600 recognizes as a billing card. When the card specifying information is received, the card ID information management unit 504 judges if the transmitted card ID information and the received card specifying information are identical.

When the card ID information management unit 504 judges that the transmitted card ID information and the received card specifying information are identical, the card ID information management unit 504 transmits a judgment instruction to an information management unit 505. When the card ID information management unit 504 judges that the transmitted card ID information and the received card specifying information are not identical, the card ID information management unit 504 indicates that the card ID information management unit 504 received instruction information for a different memory card, and the card ID information management unit 504 transmits payment status information indicating "invalid" to the cash register 600 via the communication unit 501. The payment status information indicates one of "invalid", "paid", and "unpayable".

[Information Management Unit 505]

The information management unit 505 receives the register ID information, the instruction ID information, the request time information, and the amount of money to be paid, from the cash register 600 via the communication unit 501. The instruction ID information is for specifying the instruction information. The request time information indicates time at which a clock in the cash register 600 records when the transmission of the instruction information starts.

When the judgment instruction is received from the card ID information management unit 504, the information management unit 505 judges if the payment request indicated by the instruction information is identical to the previous payment request based on the register ID information, the instruction ID information, and the request time information.

For example, when the user 50 purchases a piece of bread that is 200 yen, the cash register 600 transmits the instruction information to request the memory card 500 for a payment of 200 yen as an amount of money to be paid, according to the operation by the cashier 70. The instruction information here is a valid payment request. The memory card 500 deducts 200 yen from the amount of money managed by a balance management unit 506.

After the deduction has been completed, if the cash register 600 accidentally transmits the same instruction information about the piece of bread to the memory card 500, the memory card judges that the payment request is identical to the previous payment request.

An explanation about the judgment which is performed by the information management unit 505 is given below.

The information management unit 505 stores previously received register ID information as register history, previously received instruction ID information as payment request history, and previously received request time information as request time history.

The information management unit 505 judges that the payment request indicated by the instruction information is identical to the previous payment request in a case of either (i) or (ii) below.

(i) The register ID information matches the register history, and a difference between the request time information and the request time history is 5 seconds or shorter.

(ii) The instruction ID information matches the payment request history, and the difference between the request time information and the request time history is 5 seconds or shorter.

When the information management unit 505 judges that the payment request is identical, the information management unit 505 transmits the payment status information indicating "invalid" to the cash register 600 via the communication unit 501.

When the information management unit 505 judges that the payment request is not identical, the information management unit 505 transmits payment instruction information to a balance management unit 506.

[Balance Management Unit 506]

The balance management unit 506 stores balance information for the prepaid card functionality.

The user 50 pays a prepaid amount to the company that runs the shop 60 in advance. The company adds the prepaid amount to the amount indicated by the balance information.

The balance management unit 506 receives payment information indicating the amount of money to be paid from the cash register 600 via the communication unit 501.

When the amount indicated by the payment information is equal to or smaller than the amount indicated by the balance information, the balance management unit 506 deducts the amount indicated by the payment information from the amount indicated by the balance information, and transmits the payment status information indicating "paid" to the cash register 600 via the communication unit 501.

When the amount indicated by the payment information is greater than the amount indicated by the balance information, the balance management unit 506 transmits the payment status information indicating "unpayable" to the cash register 600 via the communication unit 501.

2-1-2 Cash Register 600

Figure 10:
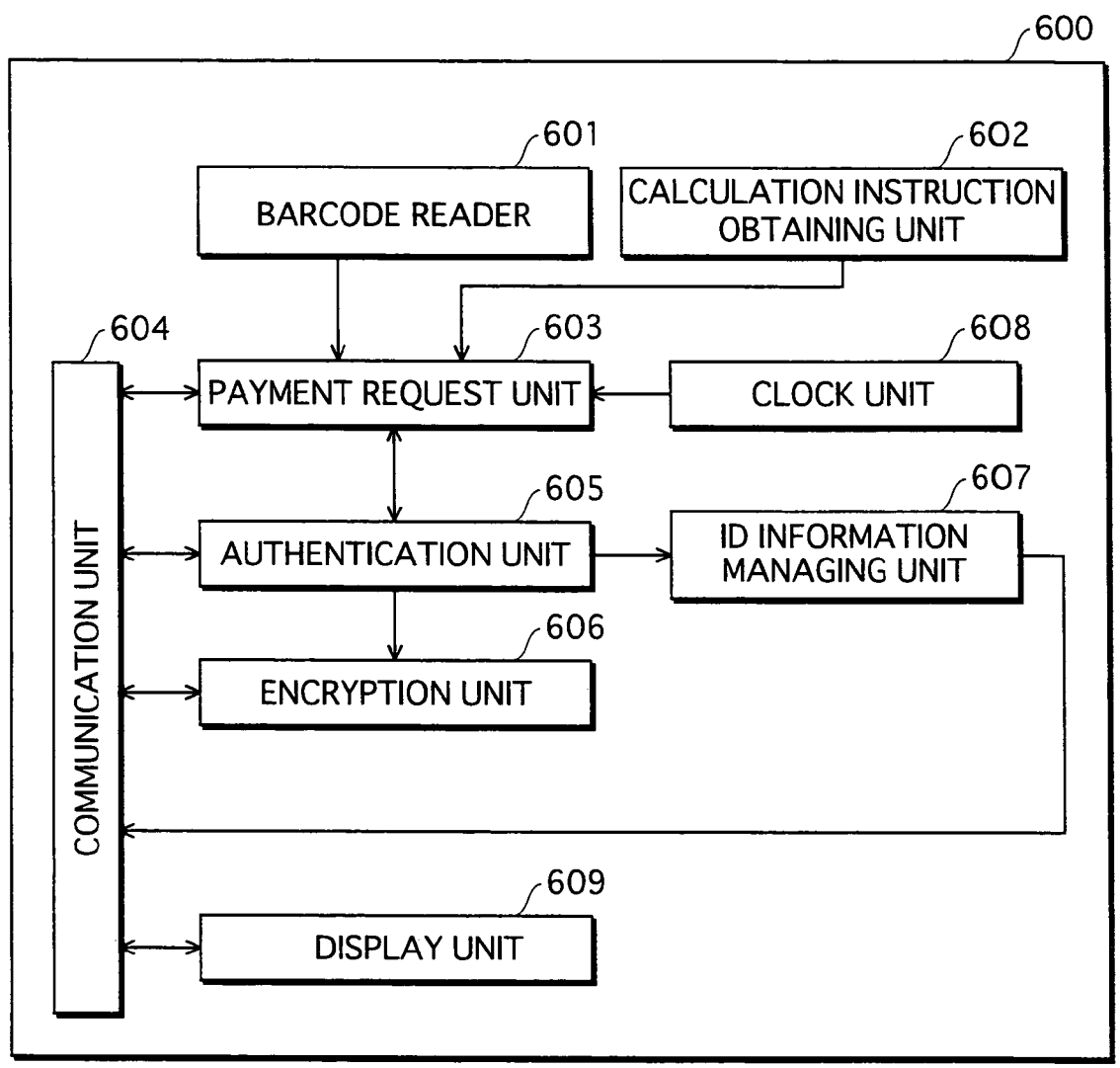
FIG. 10 is a block diagram illustrating a structure of a cash register.

FIG. 10 is a block diagram illustrating a structure of the cash register 600. The cash register 600 is structured as hardware by a CPU, a ROM storing a computer program, a RAM, and such. The cash register 600 realizes its function by the CPU operating according to the program stored in the ROM.

[Barcode Reader 601]

A barcode reader 601 reads a barcode indicating price information of the article to which the barcode is attached, and then transmits the price information to a payment request unit 603.

[Calculation Instruction Obtaining Unit 602]

A calculation instruction obtaining unit 602 is provided with a calculation instruction button, and obtains a calculation instruction when the cashier 70 presses the calculation instruction button to instruct calculation.

The calculation instruction obtaining unit 602 transmits the calculation instruction to the payment request unit 603 when the calculation instruction is obtained.

[Payment Request Unit 603]

The payment request unit 603 receives the price information from the barcode reader 601, and the calculation instruction from the calculation instruction obtaining unit 602.

When the payment request unit 603 receives the price information for two or more articles from the barcode reader 601, the payment request unit 603 calculates a total amount of prices of the articles upon reception of the calculation instruction, and generates the payment information indicating the calculated total amount. When the payment request unit 603 receives the price information for only one article from the barcode reader 601, the payment request unit 603 generates the payment information indicating the amount that is the same as the amount indicated by the price information.

When the payment information is generated, the payment request unit 603 further generates instruction ID information for identifying the generated payment information, and transmits an authentication instruction to the authentication unit 605.

When the authentication completion notification is received from the authentication unit 605, the payment request unit 603 transmits, to the memory card 500 via the communication unit 604, request time information indicating a time at which a clock unit 608 records when the authentication completion notification, the payment information, and the instruction ID information are received.

[Communication Unit 604]

A communication unit 604 transmits and receives information wirelessly with the memory card 500.

[Authentication Unit 605]

An authentication unit 605, via the communication unit 604, performs mutual authentication and sharing of a key with the memory card 500. Details of the mutual authentication and the sharing of the key will be described later.

When the mutual authentication and the sharing of the key are successfully completed, the authentication unit 605 transmits an authentication completion notification to the payment request unit 603 and an ID information management unit 607.

[Encryption Unit 606]

An encryption unit 606 encrypts and decrypts the information transmitted. When the mutual authentication and the sharing of the key are successfully completed, the encryption unit 606 obtains a session key K from the authentication unit 605.

After the successful completion of the mutual authentication and the sharing of the key by the authentication unit 605, the communication between the memory card 500 and the cash register 600 is always performed with the information being encrypted. In the transmission of the information to the memory card 500 after the successful completion of the mutual authentication and the sharing of the key, the encryption unit 606 first encrypts the information to be transmitted by using the session key K, and then the communication unit 604 transmits the encrypted information. Further, information that the communication unit 604 received from the cash register 600 after the successful completion of the mutual authentication and the sharing of the key is used for an internal process of cash register 600 after the encryption unit 606 decrypts the received information by using the session key K.

[ID Information Management Unit 607]

The ID information management unit 607 stores unique register ID information for identifying each cash register. When the authentication completion notification is received from the authentication unit 605, the ID information management unit 607 transmits the register ID information to the memory card 500 via the communication unit 604.

[Clock Unit 608]

The clock unit 608 is a clock to keep time.

[Display Unit 609]

A display unit 609 is a liquid crystal display device for displaying information such as text.

The display unit 609 receives the payment status information from the memory card 500 via the communication unit 604, and displays information according to the received payment status information. For example, the display unit 609 displays "Payment Completed" when the received payment status information indicates "paid", and "Insufficient Funds" when the received payment status information indicates "unpayable".

In addition, the display unit 609 may display other information regarding the payment operation, such as an error status indicating communication errors between the memory card, and a bar graph indicating the progress of the operation.

2-2 Operation

FIG. 11 is a flowchart showing an entire operation of the payment processing.

The user 50 carries the memory card 500 and purchases the article in the shop 60 (Step S501).

The cashier 70 has the barcode reader provided to the cash register 600 for reading the barcode attached to the article to be purchased. Then, the cashier 70 presses the calculation instruction button provided to the cash register 600.

The cash register 600 calculates an amount of money to be paid by the user 50 in exchange for the article.

The user 50 holds the memory card 500 toward the cash register 600.

The memory card 500 and the cash register 600 perform the mutual authentication and the sharing of the key (Step S502). The operation in Step S502 is substantially the same as the operation in Step S101, except that the cash register 600 and the memory card 500 are used in Step S502 instead of the automatic ticket gate 200 and the memory card 100 in Step S101, respectively. Accordingly, the details of the operation thereof is not explained here.

When the authentication in Step S502 is successful, the memory card 500 transmits the card ID information to the cash register 600 (Step S503).

Also, when the authentication in Step S502 is successful, the cash register 600 transmits the card specification information, the register ID information, the request time information, and the payment information to the memory card 500 (Step S504).

The memory card 500 judges if the card specification information matches the card ID information (Step S505). When the memory card 500 judges that the card specification information does not match the card ID information, the memory card 500 indicates that the card ID information management unit 504 received instruction information for a different memory card, and the memory card 500 transmits the payment status information indicating a payment request error to the cash register 600 (Step S506). When the memory card 500 judges that the card specification information matches the card ID information, the operation proceeds to Step S507.

When the register ID information matches the register, and a difference between the request time information and the request time history is 5 seconds or smaller (Steps S507 and S508), the memory card 500 transmits the payment status information indicating a payment request error to the cash register 600 (Step S509). When the instruction ID information matches the payment request history, and the difference between the request time information and the request time history is 5 seconds or smaller (Steps S510 and S511), the memory card 500 transmits the payment status information indicating a payment request error to the cash register 600 (Step S512).

When the amount indicated by the payment information is equal to or smaller than the amount indicated by the balance information (Step S513), the balance management unit 506 deducts the amount indicated by the payment information from the amount indicated by the balance information (Step S515), and transmits the payment status information indicating "paid" to the cash register 600 via the communication unit 501 (Step S516). When the amount indicated by the payment information is greater than the amount indicated by the balance information, the balance management unit 506 transmits the payment status information indicating "unpayable" to the cash register 600 via the communication unit 501 (Step S514).

The cash register 600 displays information based on the payment status information received from the communication unit 501 (Step S517).

3 Modified Examples

The present invention is not restricted to the above embodiments, and various modifications may be made within a scope of the technical idea of the present invention.

(1) In the above embodiments, information such as the valid zone information, the valid period information, the boarding and destination station information, the information regarding the date and hour, and the amount of money are each indicated by integer numbers. However, the above information are not restricted to integer numbers. In a case of the ID information, it is sufficient if each information is identifiable, and in a case of the information for judging a range, it is sufficient to be able to judge if each information is within or over the range. Accordingly, numbers other than integers, station names, or apparatus names may be used.

(2) The authentication between the memory card and the instruction apparatus in the above-described embodiments is performed by using the elliptic curve. However, the encryption is not restricted to the above method, and a different kind of public key such as RSA encryption may be also used.

Further, the authentication may be based on a symmetric-key cryptography in which both sides stores a common key, or any other method with which both sides are mutually authenticated and share the key may be used.

Moreover, the authentication operation is not restricted to the mutual authentication, and may be a one-way authentication. In other words, the authentication may be either of cases in which only the automatic ticket gate authenticates the memory card, or only the memory card authenticates the automatic ticket gate.

(3) The use of the memory card is not restricted to a case in which the user takes the train at the boarding station within the zone. It is possible to use the memory card in cases in which (i) the user takes the train at the boarding station that is not within the zone and drops off at the destination station within the zone, (ii) the user takes the train at the boarding station within the zone and drops off at the destination station within the zone, (iii) the user takes the train at the boarding station that is not within the zone, boards the train through the zone, and drops off at the destination station that is not within the zone, and (iv) the user takes the train at the boarding station within the zone and drops off at the destination station that is not within the zone.

The memory card adjusts the fare at the destination station by using the boarding station information which is obtained at the boarding station.

(4) The prepaid functionality of the memory card is not restricted to an occasion when the user exits the destination station. It is possible to decide when the prepaid functionality works according to a chosen fare adjustment system. For example, it is possible that a minimum fare is deducted from the amount recorded in the memory card when boarding, and then the fare is adjusted when the user exits the destination station.

(5) The memory card does not necessarily have both of the commuter pass and prepaid card functionalities, and may have one of the functionalities. The memory card having only the prepaid card functionality does not need to perform judgment of the zone, and judges the ticket gate information and the time information.

(6) When using the memory card in shopping, it is not necessary to perform the judging of both the register ID information and the instruction ID information, and it is sufficient if at least one of the above is performed.

(7) The authentication operation does not need to be performed both at boarding and drop-off. The user may board the train without being authenticated and the authentication is performed only at drop-off. On the other hand, it is also possible that the authentication is performed only when boarding and the authentication is not performed at drop-off.

(8) The payment processing device is not restricted to the memory card, and may be a handheld device having substantially the same functions as the memory card.

The handheld device includes a receiving unit such as a cellular phone and a PDA, and a payment processing device such as an IC mounted portable semiconductor memory. The receiving unit communicates with the instruction apparatus and the payment processing device performs the operations that the memory card performs other than communication.

Further, the handheld device may also be, for example, a cellular phone and a PDA having substantially the same functions as the memory card.

(9) It is also possible for the memory card explained in the first embodiment to not include the ticket gate management unit. In this case, the pass information management unit may judge, based on the stored station information, if the payment request is identical to the previous payment request from the same ticket gate.

Further, it is also possible for the memory card to not include the ticket gate management unit, and only the time information is managed by the time information management unit 107.

(10) The memory card does not necessarily include all of the functions explained in the above-described embodiments, and the memory card may be any structure with a function for reducing incorrect collection.

(11) The time information does not necessarily have to be kept to the second, and the time information may be kept by hour, day, or other time unit.

In addition, the valid period information for the commuter pass stored in the memory card and the gate time information transmitted from the ticket gate do not necessarily have the same format. For example, it is possible that the valid period information for the commuter pass stored in the memory card is indicated by day, and the gate time information transmitted from the ticket gate is indicated by seconds, and vice versa.

(12) As a judging method based on the valid period information, it is possible to judge between "in-period" and "out-period" by comparing the valid period information and one of boarding time and drop-off time.

(13) Although the above explanations are given by taking the fare adjustment and settlement as examples, it is also possible to use the present invention in a point adjustment system for adding and removing an amount of points.

The points referred to here are used in such a system in which the user earns a certain amount of points according to a payment made for a service, and the user exchanges the earned points later on, with an item having a corresponding value to the amount of points the user wishes to exchange.

The system for adding and removing the amount of points is structured by an instruction apparatus and a value holding system.

For example, the instruction apparatus is a cash register at supermarkets, and the value holding system is a system including a memory card and a handheld device that records the amount of points which is added or removed in the memory card. The instruction apparatus transmits a point adjustment request to the value holding system. The value holding system judges if the point adjustment request is valid and not identical, for example. The same method of judgment as explained in the above-described embodiments is used. The value holding system stores point information indicating the amount of the points that have been added. When judging that the request is valid, the value holding system adjusts the points stored in the memory card by adding or removing the requested amount of points to or from the amount of points indicated by the point information. When judging that the request is not valid, the value holding system rejects the request.

As indicated in the above, the term "point adjustment" is used herein as a concept that includes both the addition and removing of the amount of points. Specifically, when the instruction apparatus transmits a request of adding points, the value holding system adjusts the amount of points by adding the amount indicated by the request unless the request is invalid. When the instruction apparatus transmits a request of removing points, the value holding system adjusts the points by removing the amount of points indicated by the request unless the request is invalid.

(14) The present invention may also be a method that includes steps explained in the embodiments. The present invention may also be a computer program that realizes the method when executed by a computer, and may also be digital signals made of the computer programs.

Further, the present invention may also be a computer readable storage medium, such as a flexible disc, a hard disk, a CD-ROM, an MO, a DVD, a DVD-ROM, a DVD-RAM, a BD (Blue-ray Disc), and a semiconductor memory, that stores the program or the digital signals. The present invention may also be the program or the digital signals stored in the computer readable storage medium.

In addition, the present invention can also be the computer program or the digital signals that are transmitted via a telecommunication line, a wireless connection, a cable communication line, and the network represented by the Internet, a data and audio broadcast, and the like.

Further, the present invention may also be a computer system comprising a microprocessor and a memory, in which the memory stores the computer program and the microprocessor operates according to the program.

Moreover, the present invention may also be such that the computer program or the digital signals are transmitted to an independent computer system, via the storage medium that stores the computer program or the digital signals, or via the network, so as to be executed in the independent computer system.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

What is claimed is:

1. A value holding apparatus operable to process a payment for use of a transport facility requested from a request apparatus, said value holding apparatus comprising:
   a zone recording unit operable to record information indicating a first zone in which a fare adjustment is unnecessary;
   a location information receiving unit operable to receive, from the request apparatus, first location information that indicates a first location where the use of the transport facility ends;
   a receiving unit operable to receive request information indicating a request for payment from the request apparatus;
   a storage unit operable to store second location information that indicates a second location where the use of the transport facility starts;
   an obtaining unit operable to obtain a second zone in which the transport facility is used, by using the first location information and the second location information;
   a judging unit operable to judge whether the second zone is included in the first zone, and to judge that the request information is invalid when the second zone is included in the first zone; and
   a rejecting unit operable to reject the request information when the request information is judged to be invalid by said judging unit.

2. A value holding apparatus according to claim 1, wherein:
   the payment is processed by using a point; and
   said receiving unit is operable to receive, as the request information, information that indicates removal of the point.

3. A value holding system according to claim 1, wherein:
   the payment is processed by using a value equivalent to money; and
   said receiving unit is operable to receive, as the request information, information that indicates removal of the value.

4. A value holding apparatus according to claim 3, wherein said judging unit is further operable to store a piece of request information last received by said receiving unit, and to judge whether the request information is invalid by using the stored piece of request information and a currently received piece of request information when the second zone is not included in the first zone.

5. A value holding apparatus according to claim 4, wherein said judging unit is operable to judge that the request information is invalid when the stored piece of request information matches the currently received piece of request information.

6. A value holding apparatus according to claim 4, wherein:
   each request information contains an apparatus ID identifying a request apparatus; and
   said judging unit is operable to judge that the request information is invalid when an apparatus ID contained in the stored piece request information matches an apparatus ID contained in the currently received piece of request information.

7. A value holding apparatus according to claim 4, wherein:
   each request information contains a location ID identifying a location of a request apparatus, and
   said judging unit is operable to judge that the request information is invalid when a location ID contained in the stored piece of request information matches a location ID contained in the currently received piece of request information.

8. A value holding apparatus according to claim 4, wherein:
each request information contains a request ID identifying the request information; and
said judging unit is operable to judge that the request information is invalid when a request ID contained in the stored piece of request information matches a request ID contained in the currently received piece of request information.

9. A value holding apparatus according to claim 4, wherein said judging unit is operable to judge that the request information is invalid when a difference between the stored piece of request information and the currently received piece of request information is within a predetermined range.

10. A value holding apparatus according to claim 4, wherein:
each request information contains time information indicating a time relating to the request; and
said judging unit is operable to judge that the request information is invalid when a difference between a time indicated by the time information in the stored piece of request information and a time indicated by the time information in the currently received piece of request information is within a predetermined range.

11. A value holding apparatus according to claim 4, wherein said value holding apparatus is structured by a handheld device and a memory card, and wherein:
said handheld device includes said receiving unit; and
said memory card includes said judging unit and said rejecting unit.

12. A value holding apparatus according to claim 4, wherein said value holding apparatus is a memory card.

13. A value holding apparatus according to claim 4, wherein said value holding apparatus is a handheld device.

14. A value holding method performed by a value holding apparatus that processes a payment for use of a transport facility requested from a request apparatus, said value holding method comprising:
recording information in the value holding apparatus that indicates a first zone in which a fare adjustment is unnecessary;
receiving, from the request apparatus, first location information that indicates where the use of the transport facility ends;
receiving request information indicating a request for payment from the request apparatus;
storing second location information in the value holding apparatus that indicates a second location where the use of the transport facility starts;
obtaining a second zone in which the transport facility is used, by using the first location information and the second location information;
judging whether the second zone is included in the first zone, and judging that the request information is invalid when the second zone is included in the first zone; and
rejecting the received request information when the request information is judged to be invalid in said judging.

15. A computer program recorded on a computer-readable medium for causing a computer to execute procedures which are performed by a value holding apparatus that processes a payment for use of a transport facility requested from a request apparatus, said procedures comprising:
recording information in the value holding apparatus that indicates a first zone in which a fare adjustment is unnecessary;
receiving, from the request apparatus, first location information that indicates where the use of the transport facility ends;
receiving request information indicating a request for payment from the request apparatus;
storing second location information in the value holding apparatus that indicates a second location where the use of the transport facility starts;
obtaining a second zone in which the transport facility is used, by using the first location information and the second location information;
judging whether the second zone is included in first zone, and judging that the request information is invalid when the second zone is included in the first zone; and
rejecting the received request information when the request information is judged to be invalid in said judging.

16. A transaction system structured by a request apparatus and a value holding apparatus, wherein:
said request apparatus is operable to transmit request information indicating a request for payment to said value holding apparatus; and
said value holding apparatus comprises:
a zone recording unit operable to record information indicating a first zone in which a fare adjustment is unnecessary;
a location information receiving unit operable to receive, from the request apparatus, first location information that indicates a first location where the use of the transport facility ends;
a receiving unit operable to receive request information indicating a request for payment from said request apparatus;
a storage unit operable to store second location information that indicates a second location where the use of the transport facility starts;
an obtaining unit operable to obtain a second zone in which the transport facility is used, by using the first location information and the second location information;
a judging unit operable to judge whether the second zone is included in the first zone, and to judge that the request information is invalid when the second zone is included in the first zone; and
a rejecting unit operable to reject the request information when the request information is judged to be invalid by said judging unit.

17. A transaction system according to claim 16, wherein said value holding apparatus is a memory card.

18. A transaction system according to claim 16, wherein said value holding apparatus is a handheld device.

19. A transaction system according to claim 16, wherein said value holding apparatus is structured by a handheld device and a memory card, and
wherein said handheld device includes said receiving unit, and said memory card includes said judging unit and said rejecting unit.

* * * * *